(12) United States Patent
Wada

(10) Patent No.: US 7,818,689 B2
(45) Date of Patent: Oct. 19, 2010

(54) INFORMATION MANAGING METHOD, INFORMATION MANAGING APPARATUS, INFORMATION MANAGING PROGRAM AND STORAGE MEDIUM

(75) Inventor: Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 1786 days.

(21) Appl. No.: 10/951,424

(22) Filed: Sep. 28, 2004

(65) Prior Publication Data

US 2005/0144190 A1 Jun. 30, 2005

(30) Foreign Application Priority Data

Sep. 29, 2003 (JP) ............................ 2003-338488
Oct. 8, 2003 (JP) ............................ 2003-349503

(51) Int. Cl.
G06F 3/00 (2006.01)
G06F 17/00 (2006.01)

(52) U.S. Cl. ...................... 715/853; 715/204; 707/634; 707/705; 707/737

(58) Field of Classification Search ......... 715/200–204, 715/853; 707/634, 705, 737
See application file for complete search history.

(56) References Cited

U.S. PATENT DOCUMENTS

| | | | |
|---|---|---|---|
| 5,706,457 A * | 1/1998 | Dwyer et al. ............... | 715/835 |
| 6,262,732 B1 * | 7/2001 | Coleman et al. ............ | 715/835 |
| 6,335,742 B1 * | 1/2002 | Takemoto .................... | 715/781 |
| 6,810,404 B1 * | 10/2004 | Ferguson et al. ............ | 707/200 |
| 2001/0030666 A1 | 10/2001 | Okada et al. | |
| 2002/0033848 A1 * | 3/2002 | Sciammarella et al. ...... | 345/838 |
| 2002/0075310 A1 * | 6/2002 | Prabhu et al. ............... | 345/764 |
| 2002/0075330 A1 * | 6/2002 | Rosenzweig et al. ........ | 345/854 |
| 2004/0125150 A1 * | 7/2004 | Adcock et al. .............. | 345/810 |
| 2004/0145602 A1 * | 7/2004 | Sun et al. .................... | 345/720 |

(Continued)

FOREIGN PATENT DOCUMENTS

JP 10-283366 10/1998

(Continued)

OTHER PUBLICATIONS

Chinese Office Action for Chinese Patent Application No. 200410083112.4, dated Oct. 19, 2007 (5 pages) with translation (11 pages).

(Continued)

*Primary Examiner*—Tadeese Hailu
(74) *Attorney, Agent, or Firm*—Straub & Pokotylo; John C. Pokotylo

(57) ABSTRACT

There is disclosed an information managing method in which a plurality of information files are set as managing objects, the method includes (a) acquiring one or two classification standards which are standards to classify the information files, (b) selecting one of classification units of each of the acquired classification standards, (c) classifying the information files objects for each of the acquired classification standards and the selected one of the classification units, (d) producing a file object which represents each classified information file, (e) disposing and displaying the file object produced for each classification unit in another one-dimensional direction on a display screen, in a case where one classification standard is acquired, and (f) disposing and displaying the produced file object of the information file in each of two-dimensionally divided regions in a case where two classification standards are acquired.

24 Claims, 28 Drawing Sheets

U.S. PATENT DOCUMENTS

2004/0175764 A1* 9/2004 Nishiyama et al. ........... 435/7.2
2004/0201691 A1* 10/2004 Bryant et al. ............ 348/207.1
2005/0044100 A1* 2/2005 Hooper et al. .............. 707/102
2006/0242121 A1* 10/2006 DeVorchik et al. ............. 707/3

FOREIGN PATENT DOCUMENTS

| JP | 2000-83221 | 3/2000 |
| JP | 2002-116933 | 4/2002 |
| JP | 2002-288018 | 10/2002 |

OTHER PUBLICATIONS

Notification of Reasons For Rejection for Japanese Patent Application No. 2003-338488, mailed Nov. 18, 2008 (2 pgs.) with translation (2 pgs.).

* cited by examiner

|  | Photographing date | Photographing time | Image type | Pixel number | Photographing distance | Camera type | Non-classification |
|---|---|---|---|---|---|---|---|
| Photographing date | | | ///// | ///// | | | |
| Photographing time | | | ///// | ///// | | | |
| Image type | ///// | ///// | ///// | ///// | ///// | ///// | ///// |
| Pixel number | | | ///// | ///// { 39 | | | |
| Photographing distance | | | ///// | ///// | | | |
| Camera type | | | ///// | ///// | | | |
| Non-classification | | | ///// | ///// | | | |

FIG. 8

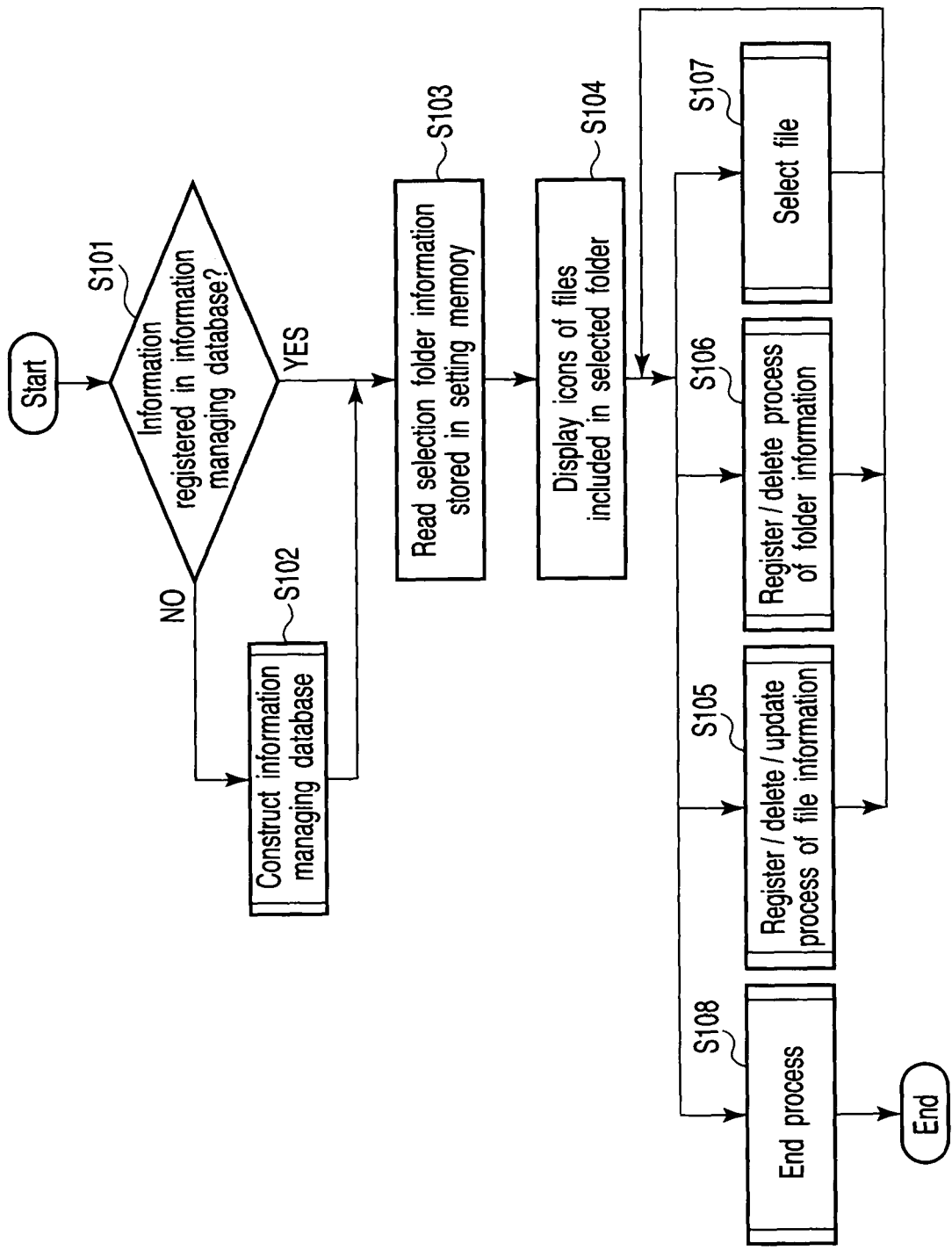
F I G. 24

INFORMATION MANAGING METHOD, INFORMATION MANAGING APPARATUS, INFORMATION MANAGING PROGRAM AND STORAGE MEDIUM

CROSS-REFERENCE TO RELATED APPLICATIONS

This application is based upon and claims the benefit of priority from prior Japanese Patent Applications No. 2003-338488, filed Sep. 29, 2003; and No. 2003-349503, filed Oct. 8, 2003, the entire contents of both of which are incorporated herein by reference.

BACKGROUND OF THE INVENTION

1. Field of the Invention

The present invention relates to an information processing apparatus, or a technique of managing an information file stored in another information processing apparatus connected to the information processing apparatus via a network.

2. Description of the Related Art

As a method in which an information file (hereinafter referred to as a "file") stored in an information processing apparatus such as a personal computer is selected or classified and managed, a method in which a folder tree is displayed to allow a user to specify a folder, and thumbnail images and icons of files included in the designated folder are arranged and displayed in order of names or preparation date and time has heretofore been known.

Moreover, a method has also been known in which contents desired by a user can be efficiently searched for based on attribute data associated and recorded with contents stored in the information processing apparatus (Jpn. Pat. Appln. KOKAI Publication No. 2002-116933).

However, to select or classify and manage the information using the technique described in Jpn. Pat. Appln. KOKAI Publication No. 2002-116933, there have been problems as follows.

In the technique described in Jpn. Pat. Appln. KOKAI Publication No. 2002-116933, attributes of the file which is an object need to be defined beforehand as a hierarchy in such a manner that the attributes are represented by the folder tree. Therefore, it is difficult to apply this technique to image files to each of which a plurality of attributes are imparted and which are stored in the processing apparatus, such as files of images photographed by electronic cameras.

Moreover, even by the use of the technique described in Jpn. Pat. Appln. KOKAI Publication No. 2002-116933, when object files are scattered and stored in many folders, the image cannot be displayed on one screen, and therefore handing has been laborious. When a large number of files are included in one folder, there has been a problem that it is difficult to specify a target file.

BRIEF SUMMARY OF THE INVENTION

According to a first aspect of the present invention, there is provided an information managing method in which a plurality of information files are managing objects, the method comprising: (a) acquiring one or two classification standards which are standards to classify the information files; (b) selecting one of classification units of each of the acquired classification standards; (c) classifying the information files which are managing objects for each of the acquired classification standards and the selected one of the classification units; (d) producing a file object which represents each classified information file; (e) disposing and displaying the classification unit in a one-dimensional direction on a display screen of a display device, and disposing the file object produced for each classification unit in another one-dimensional direction, in a case where one classification standard is acquired; and (f) disposing and displaying the produced file object of the information file in each of two-dimensionally divided regions in a case where two classification standards are acquired, the two-dimensionally divided regions being obtained by dividing the display screen for each classification unit of one classification standard in a predetermined one-dimensional direction and for each classification unit of the other classification standard in the other predetermined one-dimensional direction.

According to the first aspect of the present invention, there is provided an information managing apparatus comprising: a managing object setting section which sets the plurality of information files as managing objects; a classification standard acquisition section which acquires one or two classification standards which are standards to classify the information files; a classification unit selection section which selects one of classification units of each of the acquired classification standards; an information classification section which classifies the information files which are managing objects for the classification standards acquired by the classification standard acquisition section and for each selected one of the classification units; an object production section which produces a file object which represents each classified information file; and a display section which disposes and displays the classification unit in a one-dimensional direction on a display screen of a display device, and disposes the file object produced for each classification unit in another one-dimensional direction, in a case where the classification standard acquisition section acquires one classification standard, and which disposes and displays the produced file object of the information file in each of two-dimensionally divided regions in a case where the classification standard acquisition section acquires two classification standards, the two-dimensionally divided regions being obtained by dividing the display screen for each classification unit of one classification standard in a predetermined one-dimensional direction and for each classification unit of the other classification standard in the other predetermined one-dimensional direction.

According to the first aspect of the present invention, there is provided an information managing program which allows a computer to execute: a step of setting a plurality of information files as managing objects; (a) a step of acquiring one or two classification standards which are standards to classify the information files; (b) a step of selecting one of classification units of each of the acquired classification standards; (c) a step of classifying the information files which are managing objects for each of the acquired classification standards and the selected one of the classification units; (d) a step of producing a file object which represents each classified information file; (e) a step of disposing and displaying the classification unit in a one-dimensional direction on a display screen of a display device, and disposing the file object produced for each classification unit in another one-dimensional direction, in a case where one classification standard is acquired; and (f) a step of disposing and displaying the produced file object of the information file in each of two-dimensionally divided regions in a case where two classification standards are acquired, the two-dimensionally divided regions being obtained by dividing the display screen for each classification unit of one classification standard in a predetermined one-dimensional direction and for each classification unit of the other classification standard in the other predetermined one-dimensional direction.

According to the first aspect of the present invention, there is provided a storage medium which stores a program allowing a computer to execute: a step of setting a plurality of information files as managing objects; (a) a step of acquiring one or two classification standards which are standards to classify the information files; (b) a step of selecting one of classification units of each of the acquired classification standards; (c) a step of classifying the information files which are managing objects for each of the acquired classification standards and the selected one of the classification units; (d) a step of producing a file object which represents each classified information file; (e) a step of disposing and displaying the classification unit in a one-dimensional direction on a display screen of a display device, and disposing the file object produced for each classification unit in another one-dimensional direction, in a case where one classification standard is acquired; and (f) a step of disposing and displaying the produced file object of the information file in each of two-dimensionally divided regions in a case where two classification standards are acquired, the two-dimensionally divided regions being obtained by dividing the display screen for each classification unit of one classification standard in a predetermined one-dimensional direction and for each classification unit of the other classification standard in the other predetermined one-dimensional direction.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 8 is a diagram showing a classification standard selection screen;

FIG. 24 is a flowchart showing a schematic process procedure for selecting the file;

DETAILED DESCRIPTION OF THE INVENTION

An embodiment of the present invention will be described hereinafter with reference to the drawings.

An information managing method of a first embodiment of the present invention relates to a method of facilitating management by classification of information.

In the information managing method of the first embodiment of the present invention, an operation instruction for a user to handle a file is input based on a file display screen displayed in a display device of an information processing apparatus. An input area for setting two-dimensionally constituted file classification conditions is displayed on the file display screen. The user sets two-dimensional file classification conditions to designate the file.

Figure 1:
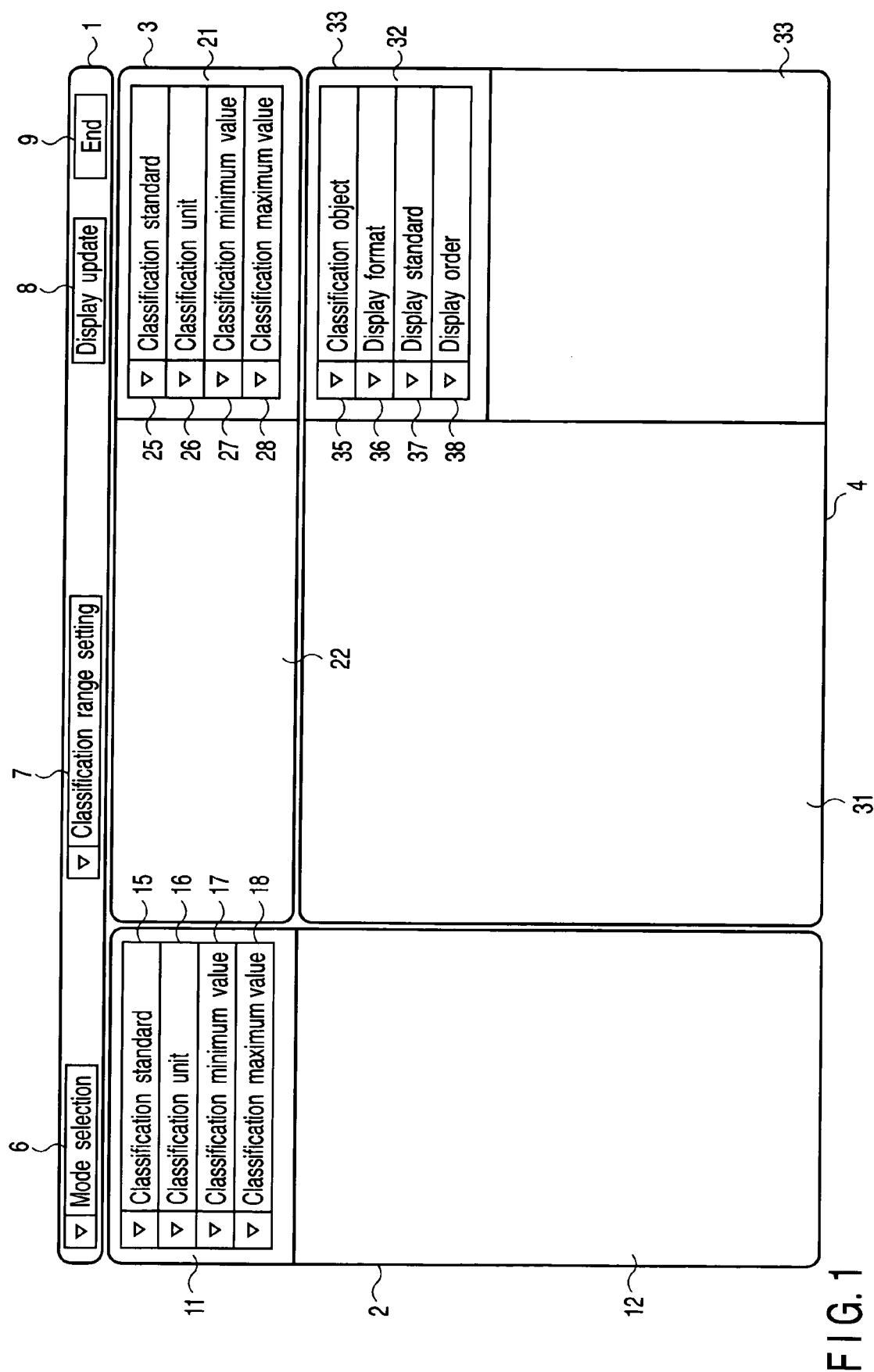
FIG. 1 is a diagram showing a constitution of a file display screen by an information managing method according to a first embodiment of the present invention.

FIG. 1 is a diagram showing a constitution of the file display screen by the information managing method according to a first embodiment of the present invention.

This file display screen comprises: a tool bar area 1 for operating screen display; an X area 2 which sets and displays a first classification condition for specifying a file; a Y area 3 which sets and displays a second classification condition for specifying the file; and a display area 4 which sets a method of displaying the specified file and which displays the file.

Moreover, in the tool bar area 1, a mode selection column 6, a classification range setting column 7, a display update button 8, and an end button 9 are disposed.

The mode selection column 6 allows selection of a "standard mode" to display the file on the once designated classification condition, or a "recursive mode" to repeat designation of the file a plurality of times and focus and display the file. In the classification range setting column 7, location of the file which is a classification object is designated. The display update button 8 updates the file display screen based on the set condition. The end button 9 ends the file display process.

In the X area 2, an X setting area 11 to set the first classification condition in detail, and an X classification area 12 which is an area to display the set classification condition are disposed. Moreover, the X setting area 11 comprises input columns for setting a classification standard 15, a classification unit 16, a classification minimum value 17, and a classification maximum value 18.

The classification standard 15 indicates a standard for classifying the file. The classification unit 16 indicates a unit of division of the classification standard 15. The classification minimum value 17 and the classification maximum value 18 designate a range to classify.

In the Y area 3, a Y setting area 21 to set the second classification condition in detail, and a Y classification area 22 which is an area to display the set classification condition are disposed. Moreover, the Y setting area 21 comprises input columns for setting a classification standard 25, a classification unit 26, a classification minimum value 27, and a classification maximum value 28.

The classification standard 25 indicates a standard for classifying the file. The classification unit 26 indicates a unit of division of the classification standard 25. The classification minimum value 27 and the classification maximum value 28 designate a range to classify.

In the file display area 4, a browse area 31, a browse setting area 32, and a selection information area 33 are disposed. Moreover, the browse setting area 32 comprises input columns (selection list) for setting a classification object 35, a display format 36, a display standard 37, and a display order 38.

In the browse area 31, file objects such as thumbnails and icons of the files classified by the first and second classification conditions are two-dimensionally displayed. In the selection information area 33, information or preview of the file corresponding to the thumbnail or the icon selected by the user is displayed among the thumbnails or the icons displayed in the browse area 31.

In the classification object 35, a type of the file displayed in the browse area 31 is selected. In the display format 36, a mode (thumbnail, icon, etc.) of the file object displayed in the browse area 31 is selected. The display standard 37 and the display order 38 designate an order to display in a case where the arrangement order in the display of the browse area 31 is undecided.

Next, a method of displaying the file in the "standard mode" will be described with reference to FIGS. 2 to 6.

Figure 2:
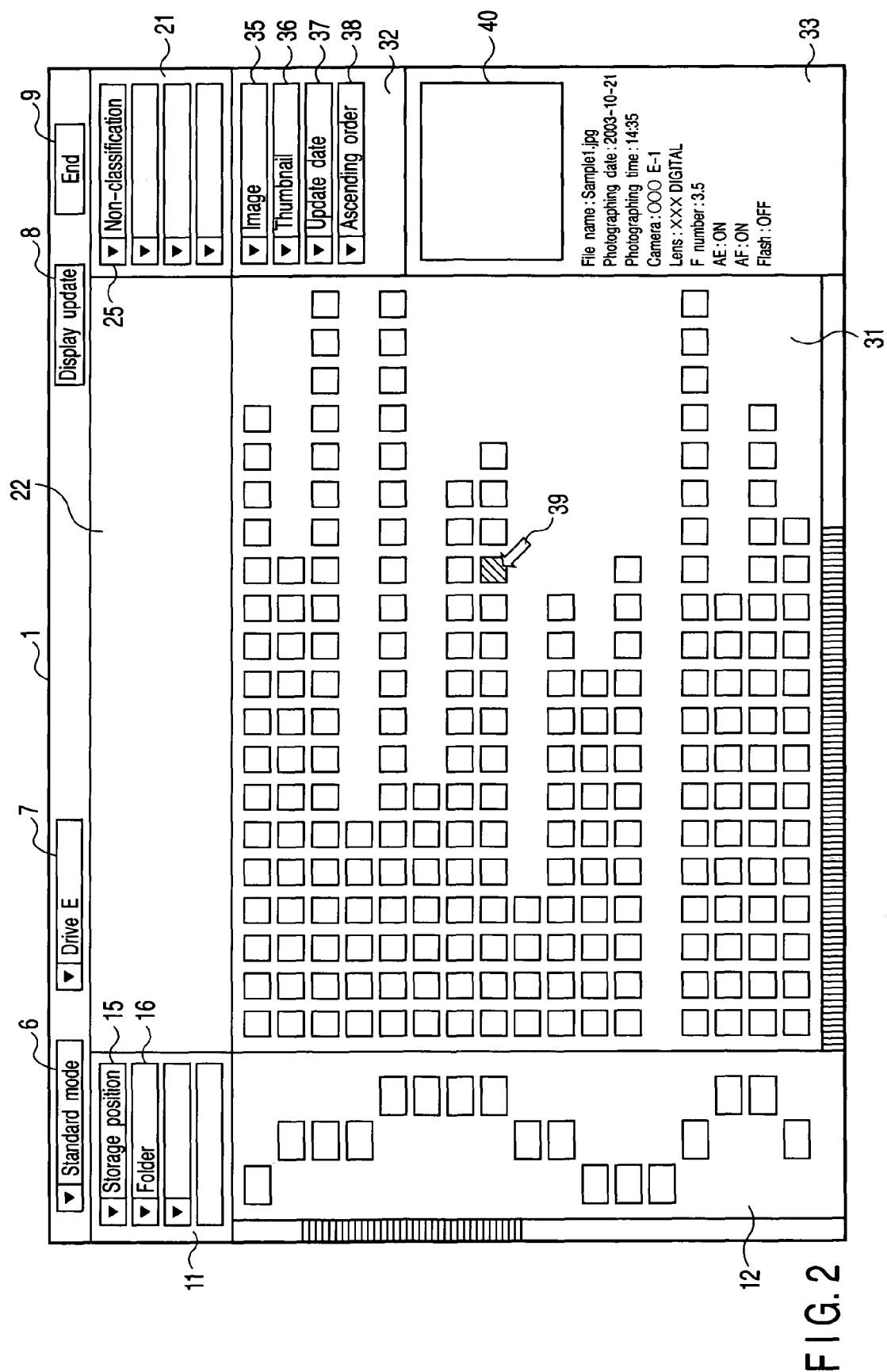
FIG. 2 is a diagram showing a screen which classifies and displays an image file for each folder.

FIG. 2 is a diagram showing a screen which classifies and displays an image file for each folder.

A user selects the standard mode from the mode selection column 6 of the tool bar area 1. Moreover, the user designates "drive E" which is the location of the classification object file in the classification range setting column 7.

Next, the user designates file classification conditions. The user sets "storage position" as the first classification condition in the classification standard 15 of the X setting area 11, and designates "folder" in the classification unit 16. In contrast, the user does not designates the second classification condition. Then, the user sets "non-classification" in the classification standard 25.

Moreover, the user sets "image" in the classification object 35, "thumbnail" in the display format 36, "update date" in the display standard 37, and "ascending order" in the display order 38.

Furthermore, when the user operates the display update button 8, a file display screen shown in FIG. 2 is displayed.

In the X classification area 12, the folder which exists in the drive E is displayed corresponding to the set classification unit. In contrast, since the classification standard 25 of the Y setting area 21 is set to the non-classification, no classification unit is displayed in the Y classification area 22.

In the browse area 31, the image file stored in the folder is displayed in a thumbnail format corresponding to a folder position of the X classification area 12.

Here, when the user designates one of the thumbnails with a mouse pointer 39, an enlarged image is displayed as a preview image 40 in the selection information area 33, and attribute data of the file is also displayed. When the user double clicks/selects one of the thumbnails with the mouse pointer 39, the image file can be opened.

Figure 3:
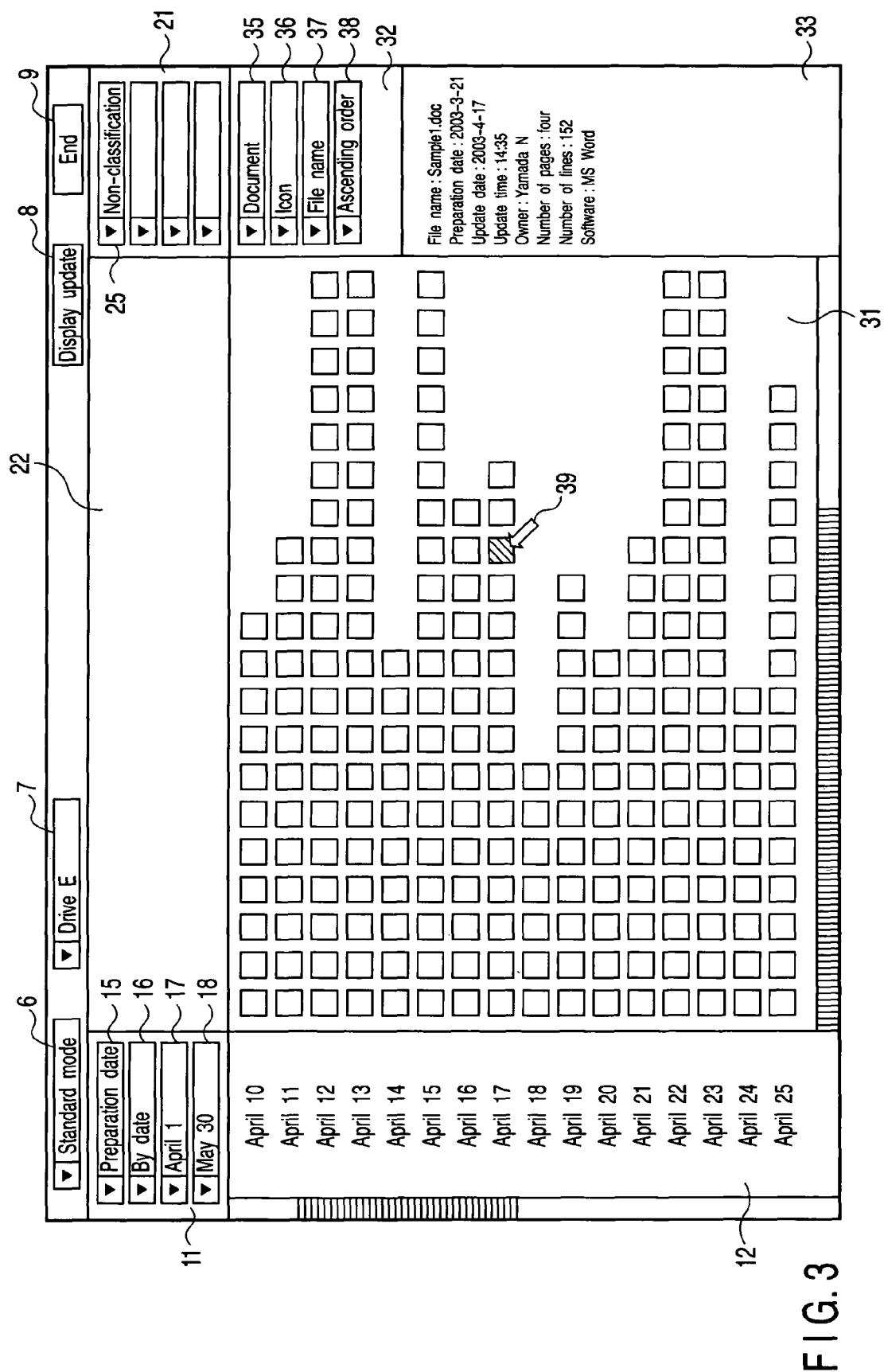
FIG. 3 is a diagram showing a screen which classifies and displays a document file every preparation date.

FIG. 3 is a diagram showing a screen which classifies and displays a document file every preparation date.

The user selects the standard mode from the mode selection column 6 of the tool bar area 1, and further designates "drive E" which is the location of the classification object file from the classification range setting column 7.

Next, the user designates the file classification condition. The user sets "preparation date" in the classification standard 15 of the X setting area 11, and designates "by date" in the classification unit 16. Moreover, the user sets "April 1" in the classification minimum value 17 and "May 30" in the classification maximum value 18 as a range to display. Additionally, the user does not designate the second classification condition. Then, the user sets "non-classification" in the classification standard 25.

Moreover, the user sets "document" in the classification object 35, "icon" in the display format 36, "file name" in the display standard 37, and "ascending order" in the display order 38, respectively.

Furthermore, when the user operates the display update button 8, the file display screen shown in FIG. 3 is displayed.

In the X classification area 12, dates from April 1 till May 30 are displayed in units of one day. In contrast, since the non-classification is set to the classification standard 25 of the Y setting area 21, any display unit is not displayed in the Y classification area 22.

In the browse area 31, the document file stored in the drive E is displayed from left to right in an alphabetical order of the file name in the form of the icon corresponding to the date position of the X classification area 12.

Here, when the user designates one of the icons with the mouse pointer 39, the attribute data of the document file is displayed in the selection information area 33. When the user double clicks/selects one of the icons with the mouse pointer 39, the document file can be opened.

Figure 4:
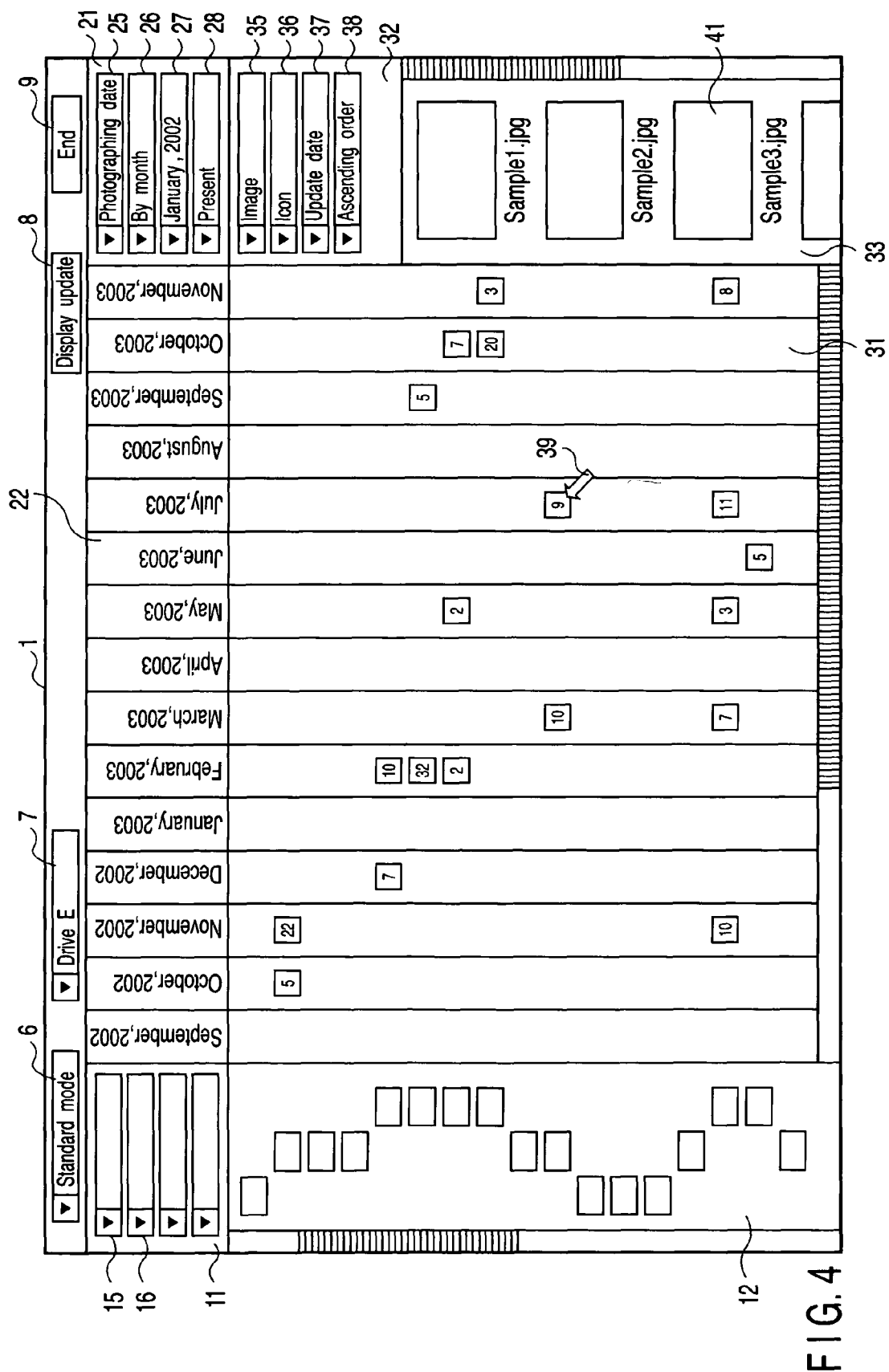
FIG. 4 is a diagram showing a screen which classifies and displays the image file by photographing date every folder.

FIG. 4 is a diagram showing a screen which classifies and displays the image file by photographing date every folder.

The user selects the standard mode from the mode selection column 6 of the tool bar area 1, and further designates "drive E" which is the location of the classification object file from the classification range setting column 7.

Next, the user designates the file classification condition. The user sets "storage position" in the classification standard 15 of the X setting area 11, and designates "folder" in the classification unit 16. Moreover, the user sets "photographing date" in the classification standard 25 of the Y setting area 21, and sets "by month" in the classification unit 26. Additionally, the user sets "January, 2002" in the classification minimum value 27 and "present" in the classification maximum value 28 as a range to display.

Moreover, the user sets "image" in the classification object 35, "icon" in the display format 36, "update date" in the display standard 37, and "ascending order" in the display order 38, respectively.

Furthermore, when the user operates the display update button 8, the file display screen shown in FIG. 4 is displayed.

In the X classification area 12, the folder which exists in the drive E is displayed. In contrast, a period from January, 2002, up to the present is displayed by month in the Y classification area 22.

In the browse area 31, the image file stored in the folder corresponding to the folder position of the X classification area 12 is classified by each photographing month and displayed in the form of the icon corresponding to each month position of the Y classification area 22. Moreover, a number is displayed on the surface of the icon, and this number indicates the number of the image files represented by the icon.

Here, when the user designates one of the thumbnails with the mouse pointer 39, the preview images and the file names of the image file included in the folder are ordered from old to new update date, arranged, and displayed in the selection information area 33.

Figure 5:
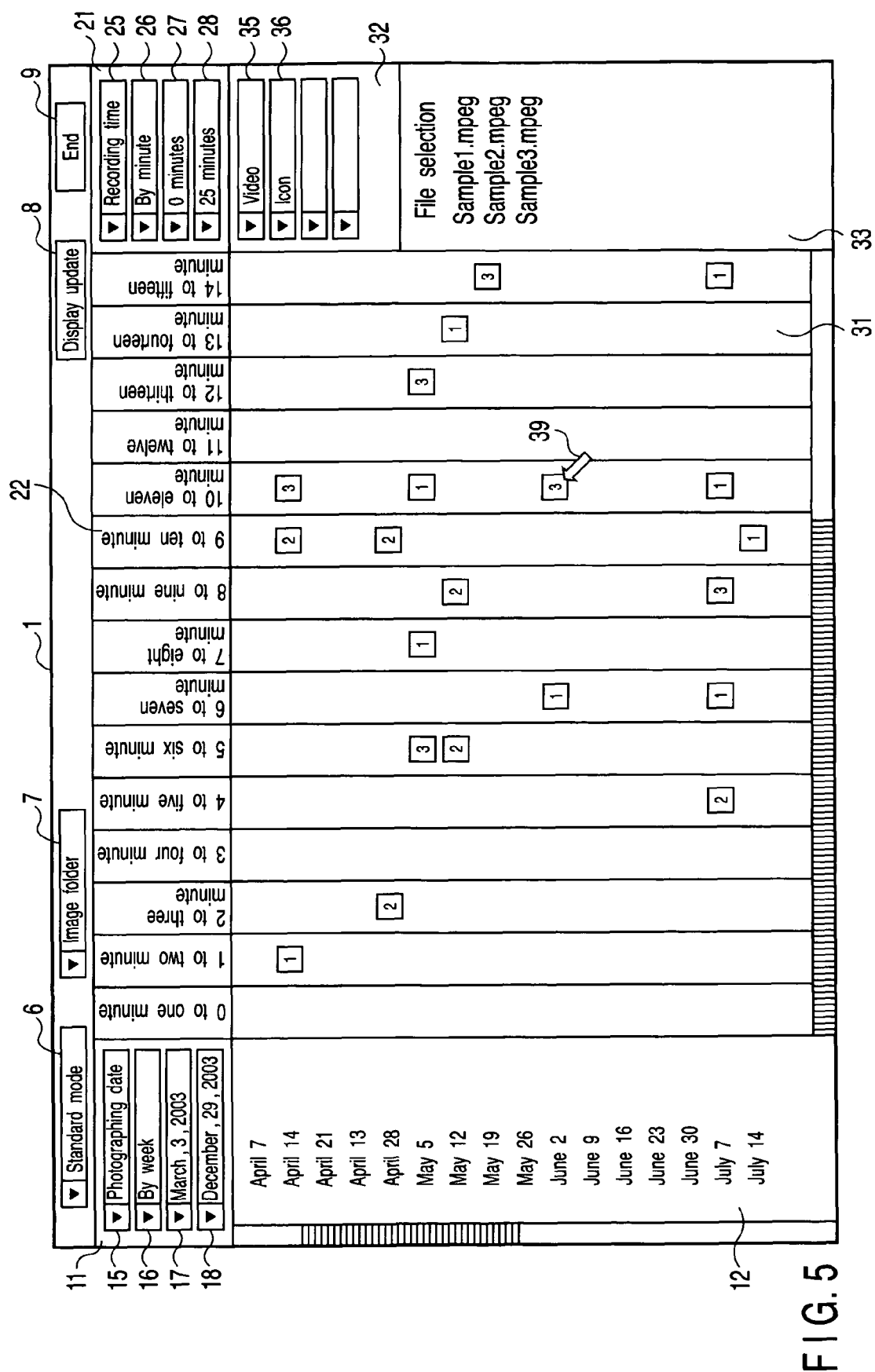
FIG. 5 is a diagram showing a screen which classifies and displays a video file by recording time every week.

FIG. 5 is a diagram showing a screen which classifies and displays a video file by recording time length every week.

The user selects the standard mode from the mode selection column 6 of the tool bar area 1, and further designates "image folder" which is the location of the classification object file from the classification range setting column 7.

Next, the user designates the file classification condition. The user sets "photographing date" in the classification standard 15 of the X setting area 11, and designates "by week" in the classification unit 16. Moreover, the user sets "Mar. 3, 2003" in the classification minimum value 17 and "Dec. 29, 2003" in the classification maximum value 18 as a range to display. Additionally, the user sets "recording time" in the classification standard 25 of the Y setting area 21, and designates "by minute" in the classification unit 26. Moreover, the user sets "0 minutes" in the classification minimum value 27, and "25 minutes" in the classification maximum value 28 as a range to display.

Moreover, the user sets "video" in the classification object 35, and "icon" in the display format 36.

Furthermore, when the user operates the display update button 8, the file display screen shown in FIG. 5 is displayed.

In the X classification area 12, dates from March 3 till December 29 are displayed by the unit of one week. On the other hand, recording time from 0 minutes to 25 minutes is displayed in units of one minute in the Y classification area 22.

In the browse area 31, the video file stored in the image folder is displayed in the form of the icon corresponding to the week position of the X classification area 12 and the recording time position of the Y classification area 22. Moreover, a number is displayed on the surface of the icon, and this number indicates the number of the video files represented by the icon.

Here, when the user designates one of the icons with the mouse pointer 39, the file name of the file represented by the icon is displayed in the selection information area 33.

Figure 6:
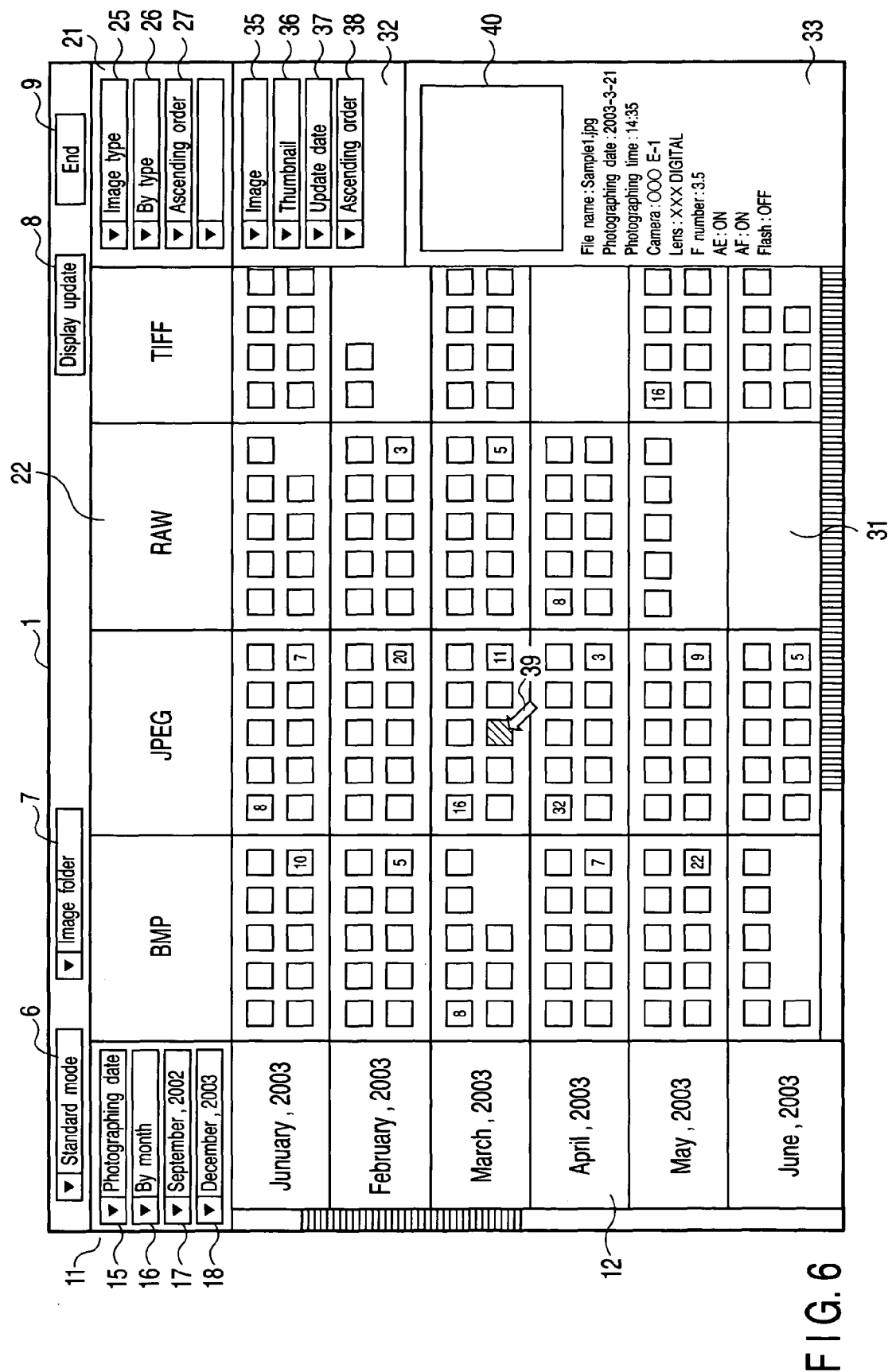
FIG. 6 is a diagram showing a screen which classifies and displays the image file by format every month.

FIG. 6 is a diagram showing a screen which classifies and displays the image file by format every month.

The user selects the standard mode from the mode selection column 6 of the tool bar area 1, and further designates "image folder" which is the location of the classification object file from the classification range setting column 7.

Next, the user designates the file classification condition. The user sets "photographing date" in the classification standard 15 of the X setting area 11, and designates "by month" in the classification unit 16. Moreover, the user sets "September, 2002" in the classification minimum value 17 and "December, 2003" in the classification maximum value 18 as a range to display. Additionally, the user sets "image type" in the classification standard 25 of the Y setting area 21, and designates "type" in the classification unit 26. Moreover, the user sets "ascending order" in the classification minimum value 27 as an order to display.

Moreover, the user sets "image" in the classification object 35, "thumbnail" in the display format 36, "update date" in the display standard 37, and "ascending order" in the display order 38.

Furthermore, when the user operates the display update button 8, the file display screen shown in FIG. 6 is displayed.

In the X classification area 12, dates from September, 2002 till December, 2003 are displayed by the unit of one month. On the other hand, type names of image formats are arranged and displayed in an alphabetical order.

The image files stored in the image folder are displayed from upper left to lower right in order of file update date in the form of the thumbnail in frames corresponding to monthly positions of the X classification area 12 and image types of the Y classification area 22 in the browse area 31. In the frames, the icons on the surfaces of which the numbers are displayed are also displayed. This number indicates the number of images represented by the icon.

For example, the icon on which number 10 is described is displayed in a right lower position in the frame designated by photographing month which is January, 2003 and image type which is BMP, and this indicates that a file update date is new, and there are ten thumbnail images which are not displayed in this frame. Then, when the user designates this icon with the mouse pointer 39, the predetermined number of the thumbnail images among the remaining ten thumbnail images are displayed in this frame. It is to be noted that immediately after the user operates the display update button 8 to update the screen display, the icon of the file at the oldest update date of the month is displayed on the upper left in each display frame.

Moreover, the icon on which number 8 is described is displayed in the left upper position in a frame designated by the photographing month which is January, 2003 and the image type which is JPEG, and this indicates that there are eight thumbnail images which have been displayed. Then, when the user designates this icon with the mouse pointer 39, eight thumbnail images displayed before in this frame are displayed.

Here, when the user designates one of the thumbnail images with the mouse pointer 39, an image larger than the thumbnail is displayed as the preview image 40 in the selection information area 33, and the attribute data of the file is also displayed.

Next, a method of displaying the file in the "recursive mode" will be described with reference to FIGS. 7 to 9.

Figure 7:
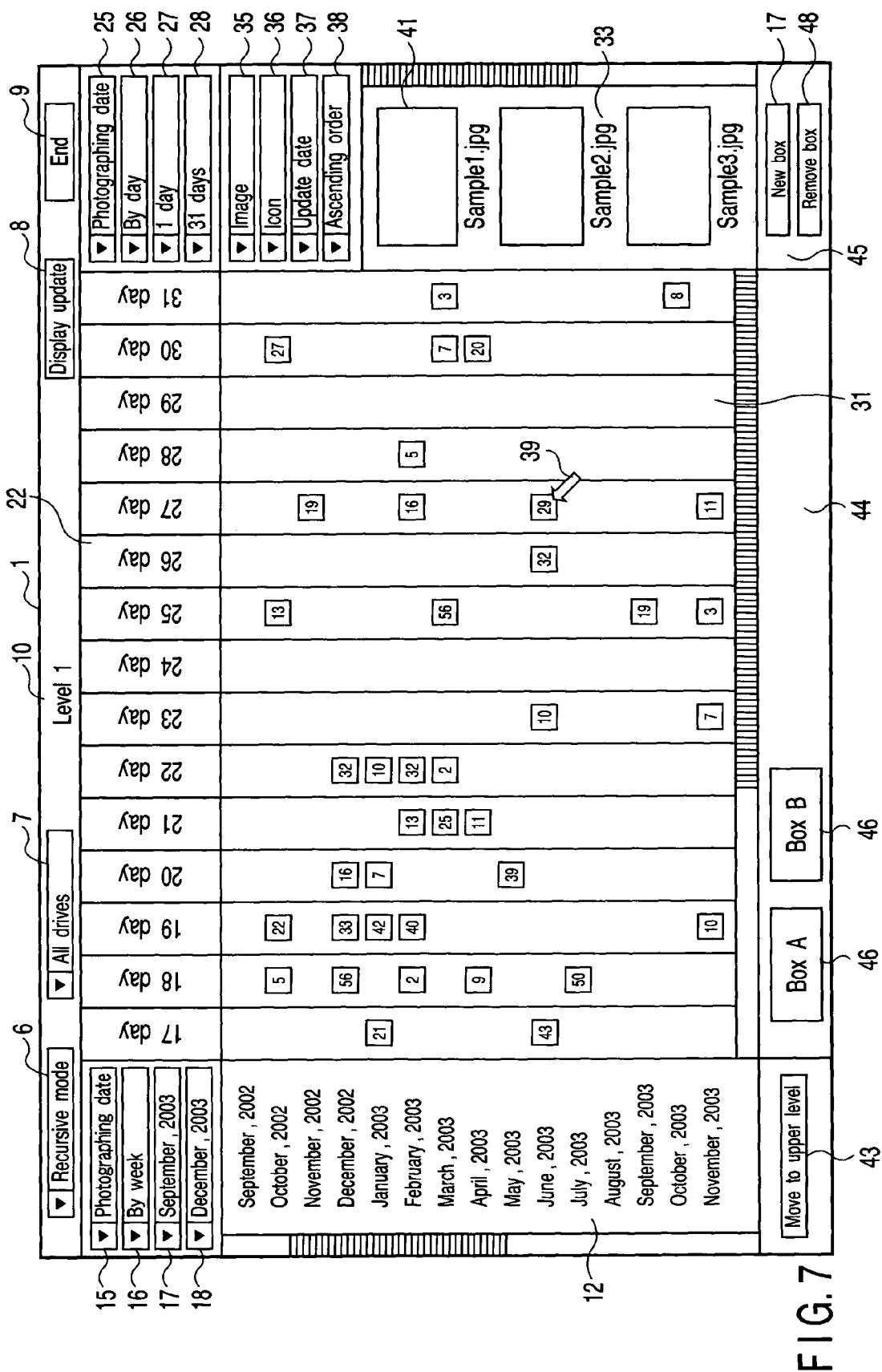
FIG. 7 is a diagram showing a screen which classifies and displays the information file by date every month.

FIG. 7 is a diagram showing a screen which classifies and displays the information file by date every month.

The constitution of the display screen in the "recursive mode" is different from that of the display screen in the "standard mode" in that a level moving button 43, a box area 44, and a box operation area 45 are newly disposed in a lower part of the screen, and a level display 10 is described in the tool bar area 1.

Moreover, a plurality of boxes 46 can be disposed in the box area 44, and a new box button 47 for newly producing the box 46, and a box delete button 48 for deleting the box 46 are disposed in the box operation area 45.

In FIG. 7, the photographing date by the month is set to the first classification condition, and the photographing date by the day is set to the second classification condition to display the icon of the image file. This display operation is similar to that described with reference to FIG. 5, and detailed description thereof is therefore omitted.

When the user drags and drops the icon displayed in the browse area 31 into the box 46 using a mouse, and associates the image file linked with the icon with the box 46. Therefore, the user can further perform an operation for classifying the file using the associated image file as an object. This operation is defined as the operation of level 2.

When the user moves the mouse pointer 39 to the box A, and, for example, double-clicks the box, a classification standard selection screen shown in FIG. 8 is displayed, for example, as a popup screen.

This screen is a screen for selecting classification standards in an X direction (vertical direction) and Y direction (right/left direction). The mouse pointer 39 is moved on this screen. When X·Y indicate desired classification standards, respectively, the mouse pointer 39 is clicked to thereby determine the selection of the classification standards. The classification standards in the X and Y directions can be selected with less operations by this function.

It is to be noted that the classification standard selection screen of FIG. 8 may be used not only in selecting the classification standard when selecting the box 46 to shift to the next level but also in selecting the classification standard of level 1 in the standard mode or the recursive mode.

Figure 9:
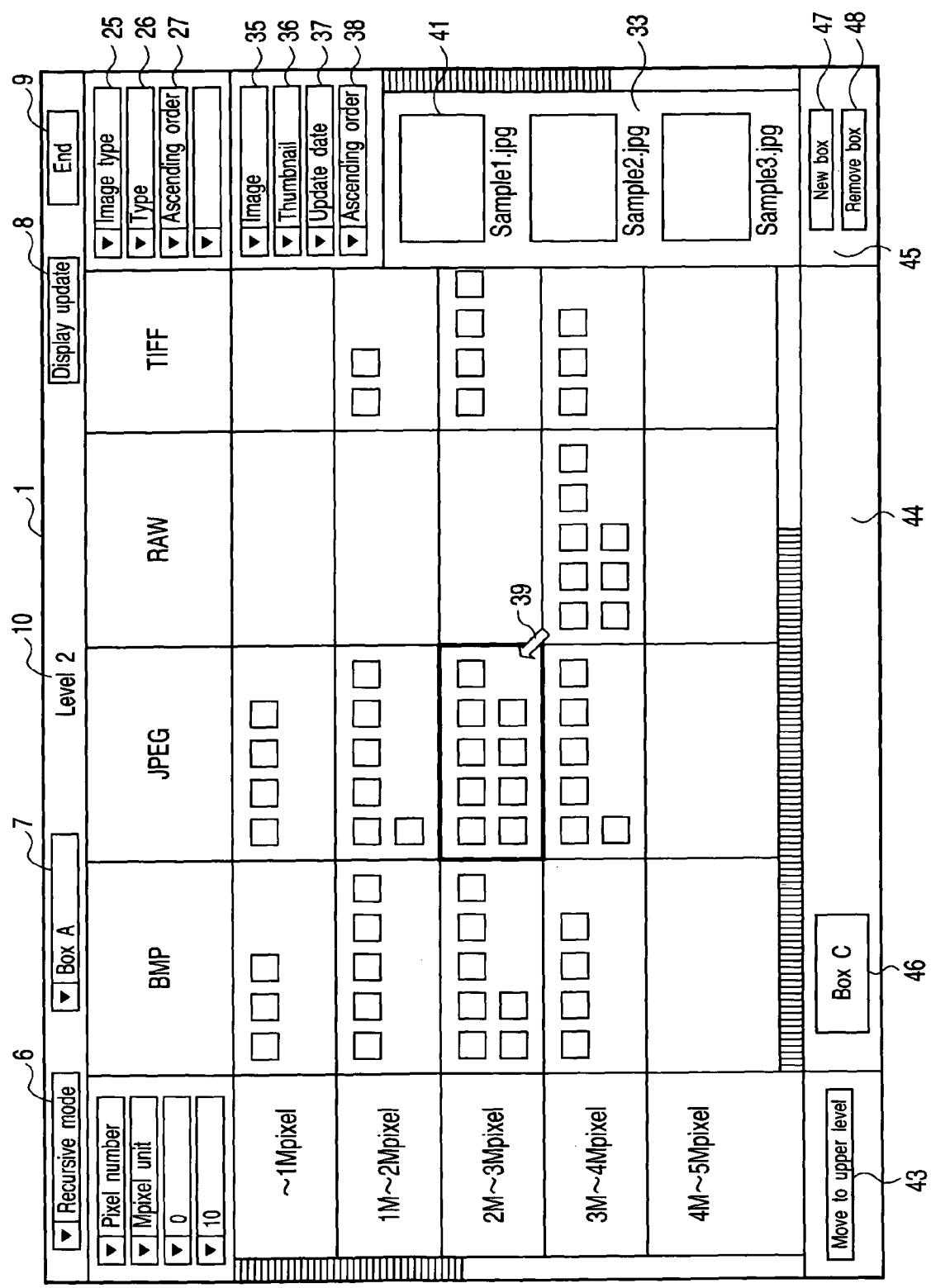
FIG. 9 is a diagram showing a file display screen of a recursive mode of level 2.

Moreover, when the selection of the classification standard is determined, a file display screen of the recursive mode of level 2 is displayed as shown in FIG. 9.

FIG. 9 is a diagram showing a screen which classifies and displays the file by the image type for each pixel number.

In the screen shown in FIG. 9, the image files are classified and displayed by the pixel number and the image type selected in the classification standard selection screen shown in FIG. 8. In the classification range setting column 7 of the tool bar area 1, "box A" is displayed. In the level display 10, "level 2" is displayed.

Further in this screen, when the user drags and drops the thumbnail image into the box 46 using the mouse, the image file linked with the thumbnail image can be associated with the box 46. Moreover, the user can perform an operation of level 3 to further classify the files using the associated image file as an object.

It is to be noted that the user can operate the level moving button 43 in each level of screen to thereby return to an upper-level screen.

It is to be noted that property information of the file can be set to the classification standards 15, 25 of the file display screen.

Figure 10:
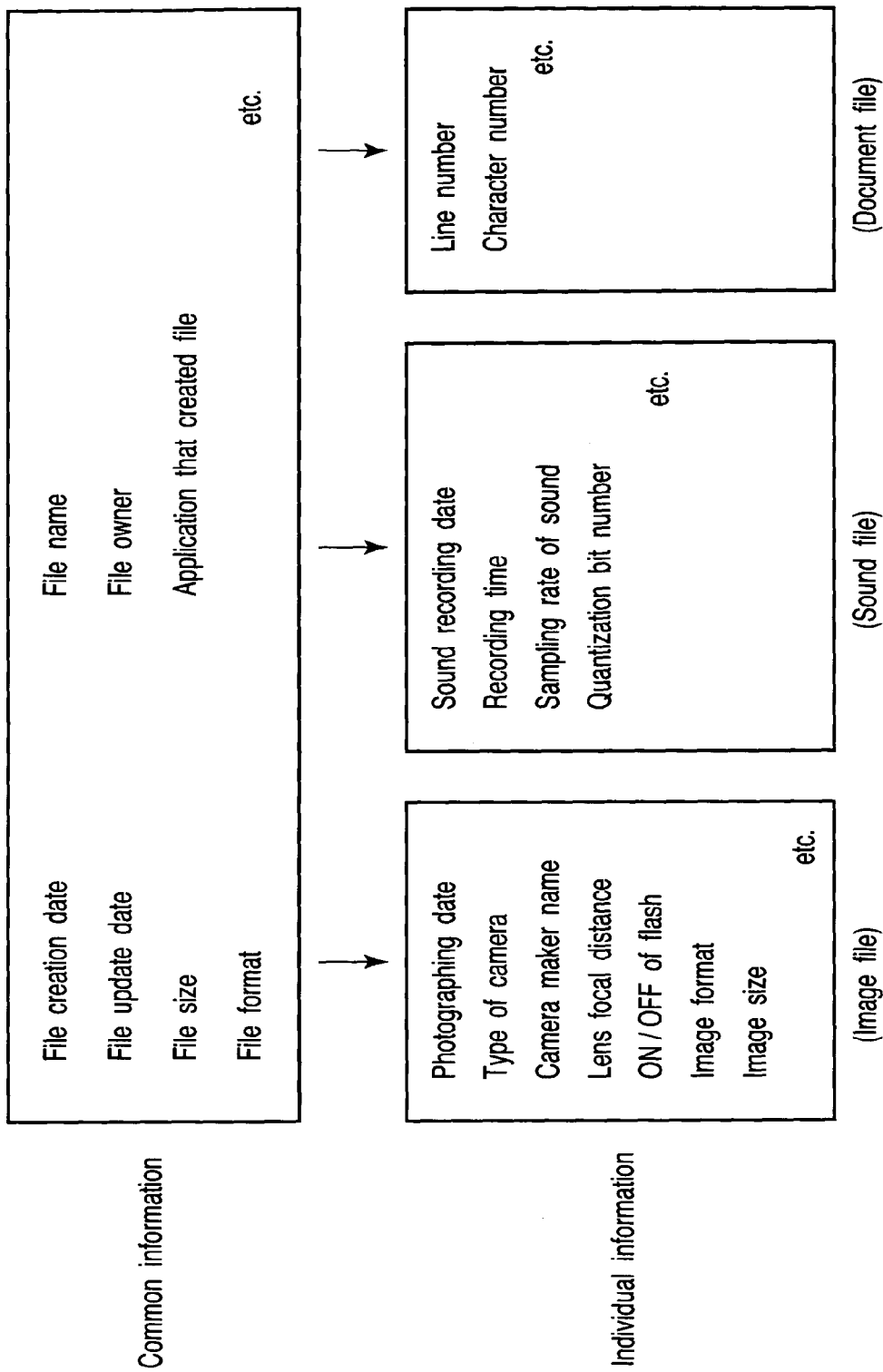
FIG. 10 is a diagram showing property information of the file.

FIG. 10 is a diagram showing examples of the property information of the file.

The property information common to the respective files includes "file preparation date", "file update date", "file size", "file format", "file name", "file possessor name", "application software name which has prepared the file" and the like.

Moreover, as individual file property information, a photographing condition can be the property information in the image file. The examples include "photographing date", "type of camera", "maker name of camera", "lens focal distance", "on/off of flash", "image format", "image size" and the like. The property information of a sound file includes "sound recording date", "recording time", "sampling rate of sound", "quantization bit number" and the like. Moreover, the property information of the document file include "line number", "character number" and the like.

Subsequently, a constitution of an information managing apparatus for realizing the above-described information classifying method, and a main process procedure will be described.

Figure 11:
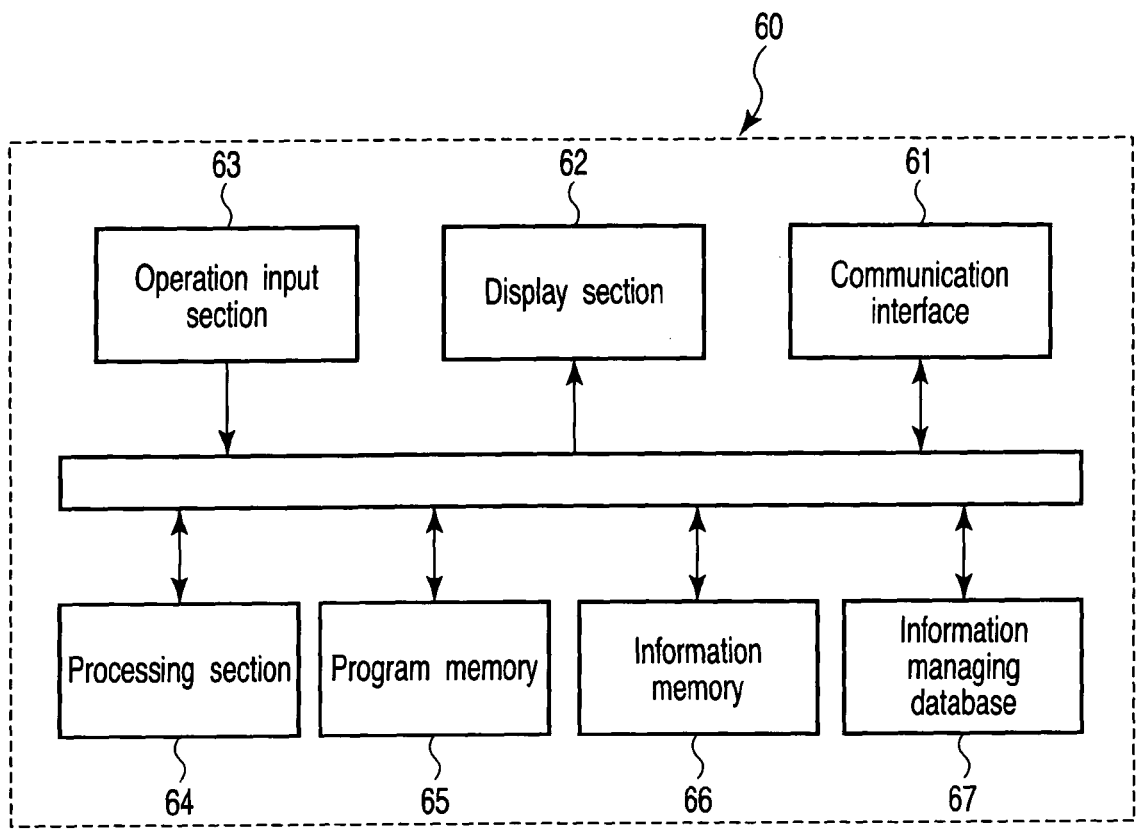
FIG. 11 is a diagram showing a constitution of an information managing apparatus.

FIG. 11 is a diagram showing a constitution of an information managing apparatus 60. The information managing apparatus 60 comprises: a communication interface 61; a display section 62; an operation input section 64; a processing section 64; a program memory 65; an information memory 66; and an information managing data base 67.

The communication interface 61 is an interface for transmitting/receiving information via communication with respect to an external apparatus (not shown). The display section 62 displays information and the like stored in the information managing apparatus 60. The operation input section 63 is a man-machine interface for receiving an operation instruction input from the user.

The processing section 64 generally controls the operation of the information managing apparatus 60. The program memory 65 stores program to control each function of the information managing apparatus 60. The information memory 66 stores data for use in a process of the information managing apparatus 60. The information managing data base 67 stores information such as a structure concerning the file or folder operable by the information managing apparatus 60. The information stored in the information managing data base 67 may be not only the information in the information managing apparatus 60 but also the information stored in the external information processing apparatus (not shown) connected via the communication interface 61.

Figure 12:
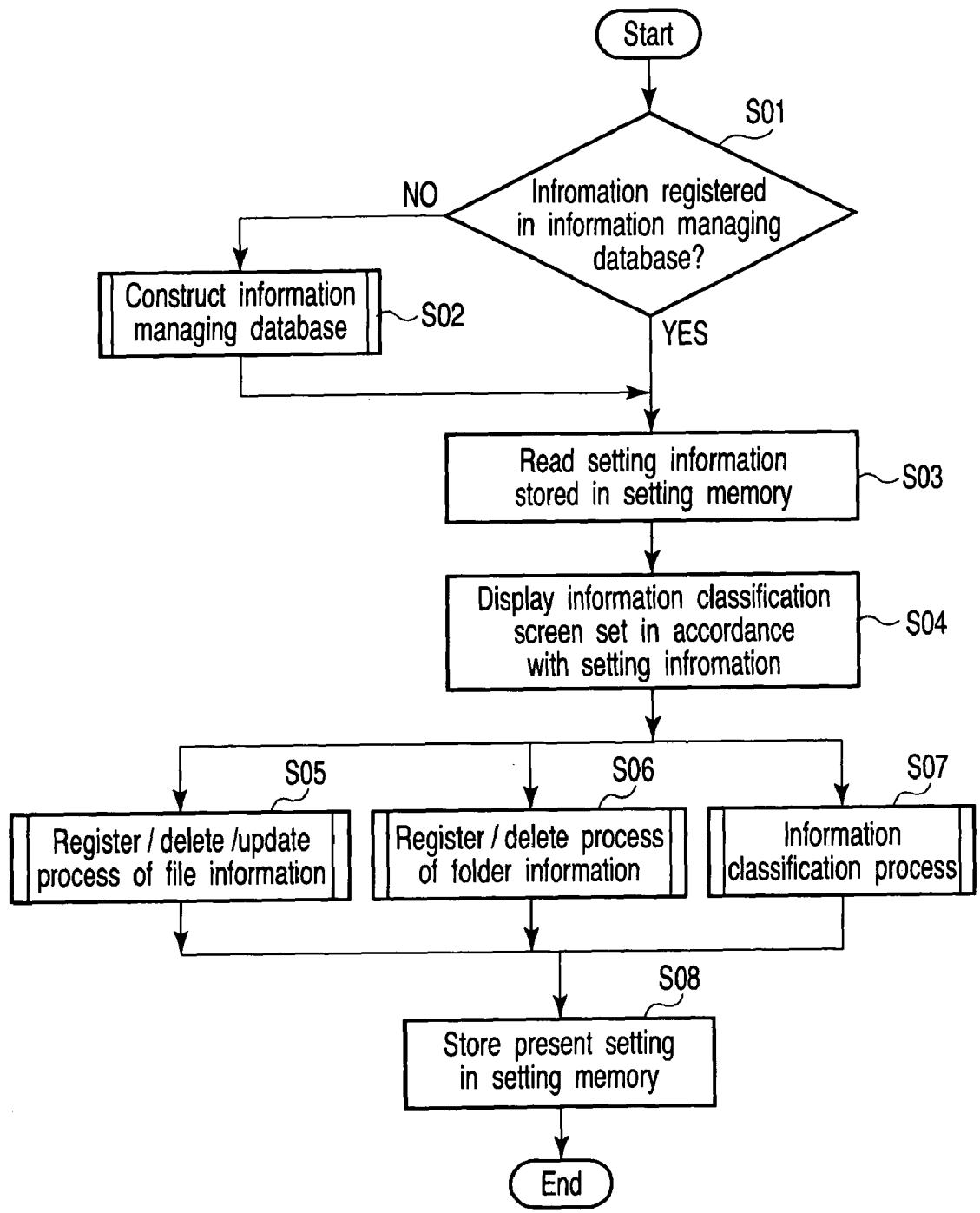
FIG. 12 is a flowchart showing a schematic process procedure of the information managing program for classifying the file.

FIG. 12 is a flowchart showing a schematic process procedure of the information managing program for classifying the files. It is to be noted that the process described hereinafter relates to a main function in the functions of the present information managing program. Therefore, even when a certain function is not described hereinafter, but when the function is described in FIGS. 1 to 9, the function is included in the functions of the present information managing program.

In the information managing program, it is first checked in step S01 whether or not the information on the file or the folder is registered in the information managing data base 67. Moreover, if No in the step S01, that is, when the information is not registered, the information managing data base is constructed in step S02.

Figure 13:
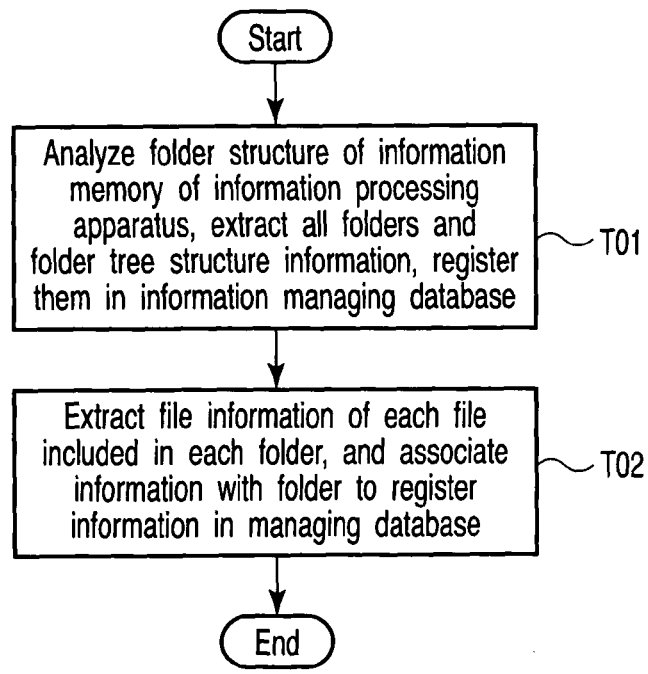
FIG. 13 is a flowchart showing a schematic process procedure of information managing data base construction.

FIG. 13 is a flowchart showing a schematic process procedure of the information managing data base construction.

In step T01, in the information managing program, the structure of the folder stored in the information memory 66 of the information managing apparatus 60 is analyzed. Moreover, information on all folders, and folder tree structure information are extracted, and the information is stored in the information managing data base 67. Subsequently, in step T02, the information managing program extracts the file information of the file included in each folder, and associates the information with the folder to register the information in the information managing data base 67.

It is to be noted that to manage the information file stored in the external information processing apparatus by the information managing data base, after end of the step T02, the external information processing apparatus connected to the communication interface 61 is identified, identification information is stored in the information managing data base, and a process similar to that of the step T01 or T02 is executed using the external information processing apparatus as an object. The extracted folder tree structure or file information is associated with the identification information of the external information processing apparatus, and stored in the information managing data base.

After constructing the information managing data base 67, turning back to FIG. 12, set information stored in the setting memory is read in step S03. Here, the setting memory stores a state used in the previous setting process by the information managing program in a storage region disposed in the information managing data base 67. Then, in step S04, the information managing program displays an information classification screen set in accordance with the setting information. Therefore, the user can start the operation from the same setting state as the previous state.

Subsequently, a register/delete/update process of the file information shown in step S05, a register/delete process of folder information shown in step S06, and an information classification process shown in step S07 are executed in parallel. As described later, these processes end when the end button 9 on the screen is pressed. Moreover, when all the processes of the steps S05 to S07 end, in step S08, set information of each control on the screen immediately before pressing the end button is stored in the setting memory. Here, the control refers to an object on the screen settable by the user, for example, the mode selection column 6, classification range setting column 7, classification standard column 15 and the like.

The file is prepared, deleted, updated, and the folder is prepared, deleted also by an operating system (OS) or another application software. The information managing program of the present embodiment monitors a state change of the file or the folder by software (including the OS) other than its own software, and updates the information of the information managing data base when detecting the preparation or deletion of the file or the folder.

It is to be noted that moving, copying, deleting, and name changing of the file or the folder are included in an information classification function of the present invention. To execute these operations, a right button of the mouse may be pressed to display a menu so that the operation can be selected in the menu. Alternatively, an operation button or menu may be disposed in the tool bar in an upper part of the screen.

Figure 14:
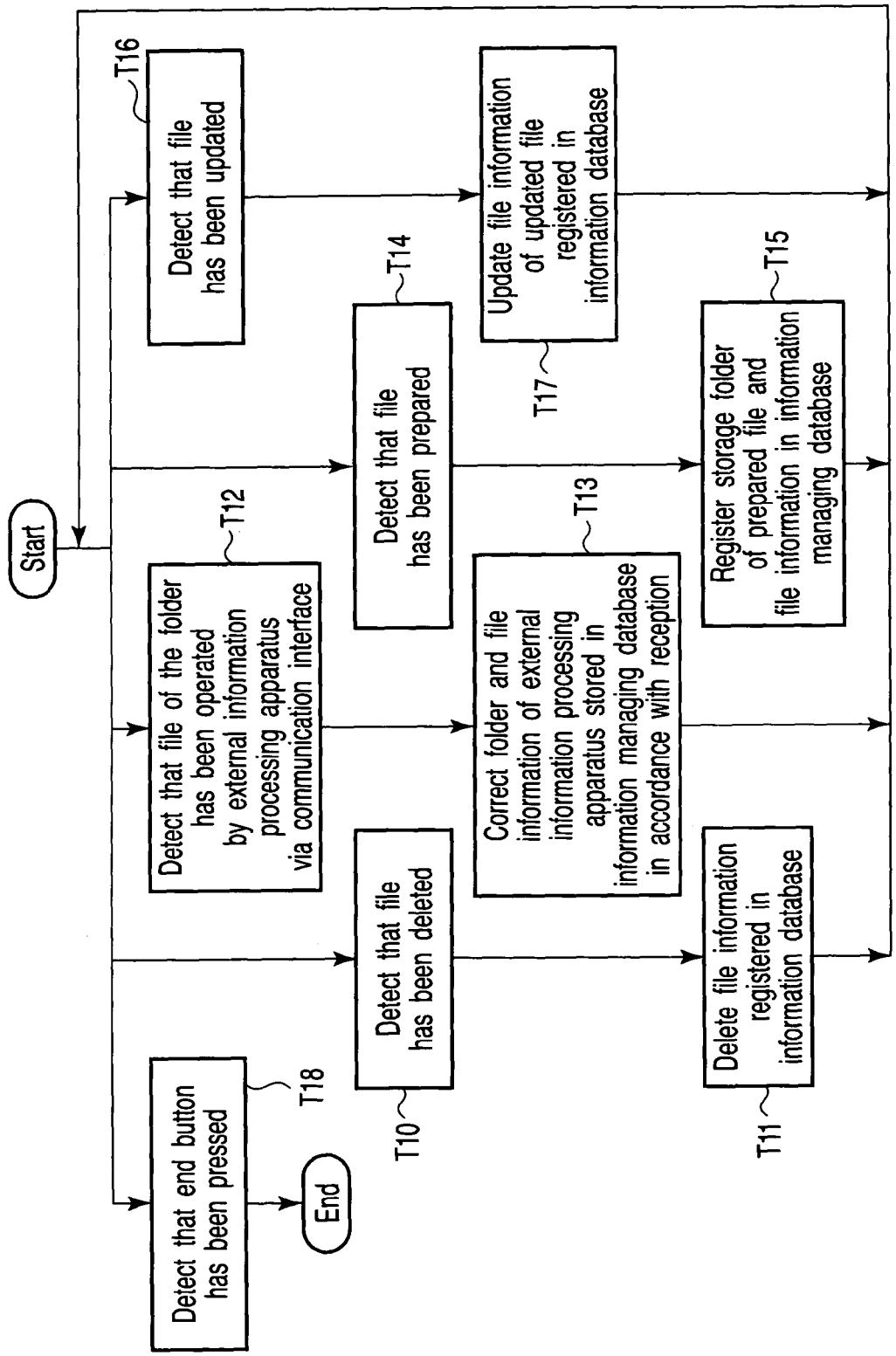
FIG. 14 is a flowchart showing a schematic process procedure to register/delete/update file information.

FIG. 14 is a flowchart showing a schematic process procedure to register/delete/update the file information as shown in the step S05 of FIG. 12.

When it is detected in step T10 that the file has been deleted, in step T11 the file information registered in the information managing data base 67 is deleted.

It is detected in step T12 that the folder or the file has been prepared, deleted, copied, or operated otherwise by the external information processing apparatus via the communication interface 61. In this case, in step T13, folder structure information or file information of an external storage device stored in the information managing data base is corrected. Since the managing of the folder or file information of the external information processing apparatus is basically the same as that of the file or folder information of its own information processing apparatus, details are not described.

It is to be noted that to detect that the folder or the file has been operated by the external information processing apparatus, the program to detect the operations may be operated beforehand by the external information processing apparatus which is a managing object, and operation detection information transmitted by the program may be received.

When it is detected in step T14 that a file has been newly prepared, in step T15, storage folder of the prepared file and file information are registered in the information managing data base.

When it is detected in step T16 that the file has been updated, in step T17, file information registered in the information managing data base of the updated file is updated.

When any process of the above-described steps T10 and T11, T12 and T13, T14 and T15, and T16 and T17 is completed, the process waits until the next state change of the file is detected.

When it is detected in step T18 that the end button has been pressed, the register/delete/update process of the file information of the step S05 ends.

Figure 15:
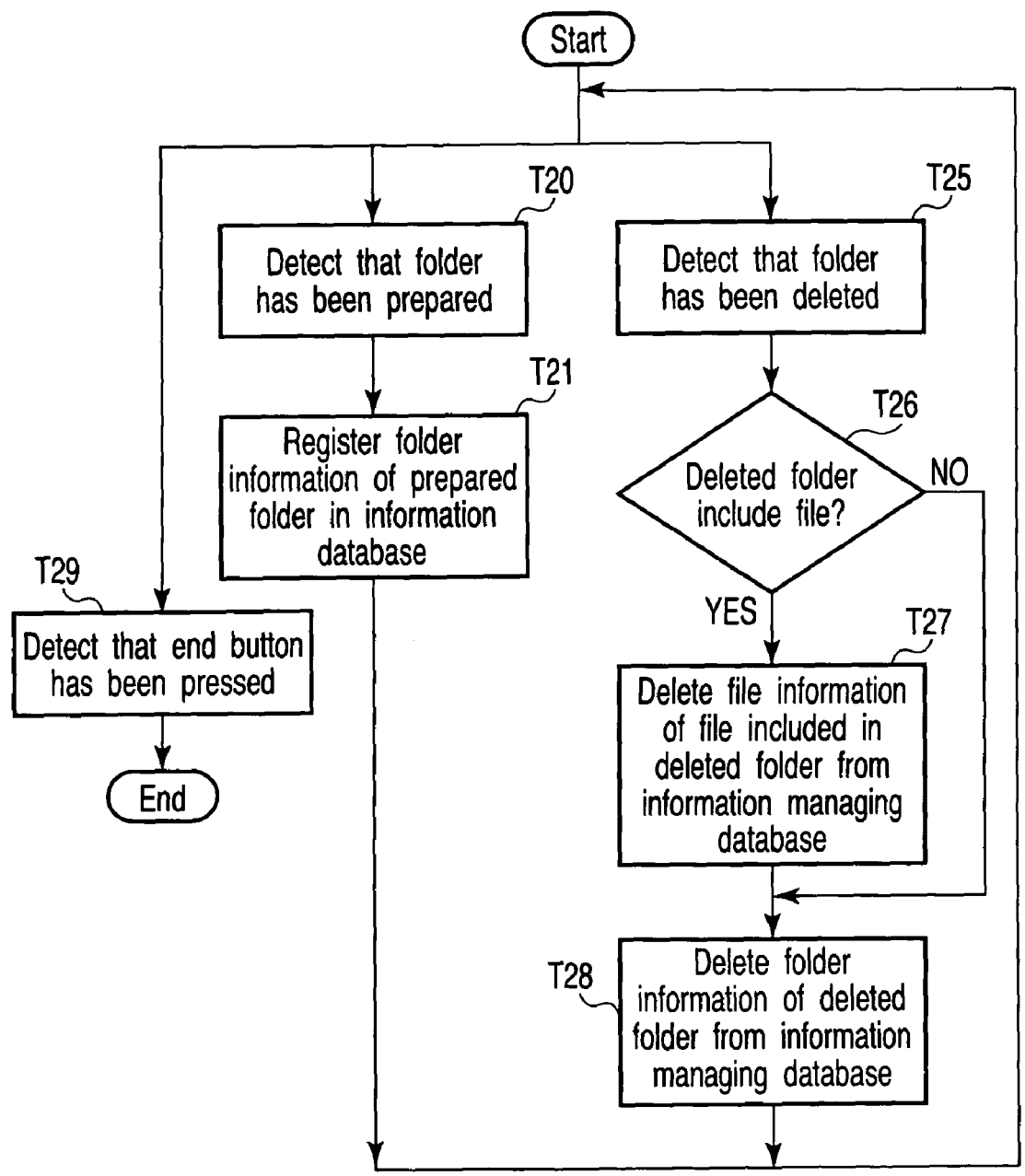
FIG. 15 is a flowchart showing a schematic process procedure to register/delete folder information.

FIG. 15 is a flowchart showing a schematic process procedure to register/delete the folder information as shown in step S06 of FIG. 12.

When it is detected in step T20 that the folder has been newly added, in step T21, the folder information of the added folder is registered in the information managing data base.

When it is detected in step T25 that the folder has been deleted, it is checked in step T26 whether or not the deleted folder has included the file. When Yes in the step T26, that is, when the file is included, in step T27, the file information of the file included in the deleted folder is deleted from the information managing data base. Moreover, in step T28, the folder information of the deleted folder is deleted from the information managing data base 67.

When any process of the above-described steps T20 and T21, and T25 to T28 is completed, the process waits until the next state change of the file is detected.

When it is detected in step T29 that the end button 9 has been pressed, the register/delete process of the folder information of the step S06 ends.

Figure 16:
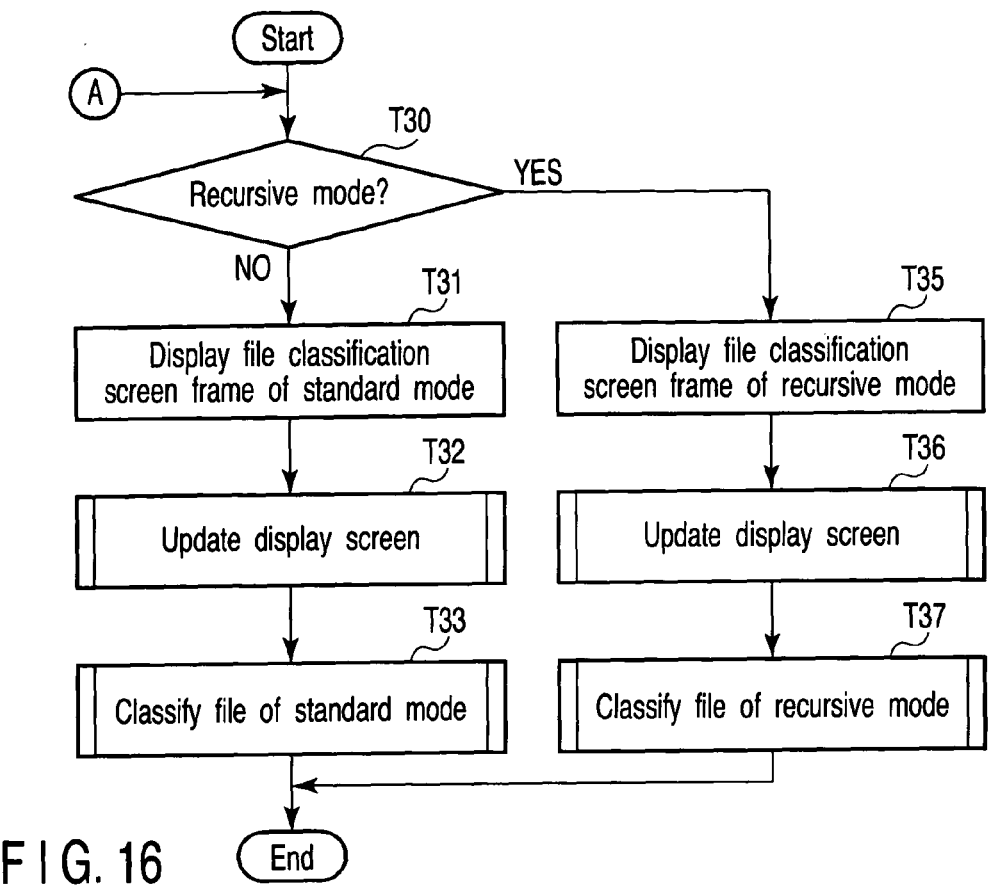
FIG. 16 is a flowchart showing a schematic operation procedure of an information classification process.

FIG. 16 is a flowchart showing a schematic operation procedure of an information classification process shown in step S07 of FIG. 12.

In the present process, an operation starts, when the user operates the display update button 8 shown in FIG. 1. First in step T30, the mode selected in the mode selection column 6 shown in FIG. 1 is checked (T30). When No in the step T30, that is, when the selected mode is a standard mode, in step T31, a file classification screen frame of the standard mode is displayed. In step T32, the display screen is updated.

Figure 17:
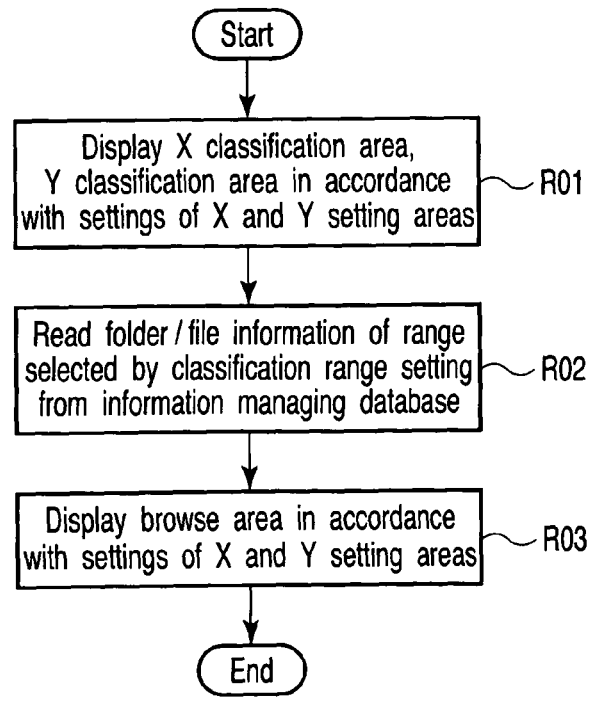
FIG. 17 is a flowchart showing a schematic operation procedure of a display screen update process.

FIG. 17 is a flowchart showing a schematic operation procedure of a display screen update process shown in the step T32 of FIG. 16.

In step R01, conditions set in the X classification area 12 and the Y classification area 22 in accordance with settings of the X setting area 11 and the Y setting area 21.

In step R02, folder/file information of the range set in the classification range setting column 7 is read from the information managing data base 67. In step R03, the folder/file classification in accordance with the settings of the X setting area 11 and the Y setting area 21 is displayed.

Moreover, turning back to FIG. 16, a file classification process of the standard mode is executed in step T33. In the file classification process of the standard mode, the process is performed in accordance with user's operation in the classification screen (e.g., FIGS. 2 to 6) of the standard mode.

Figure 18:
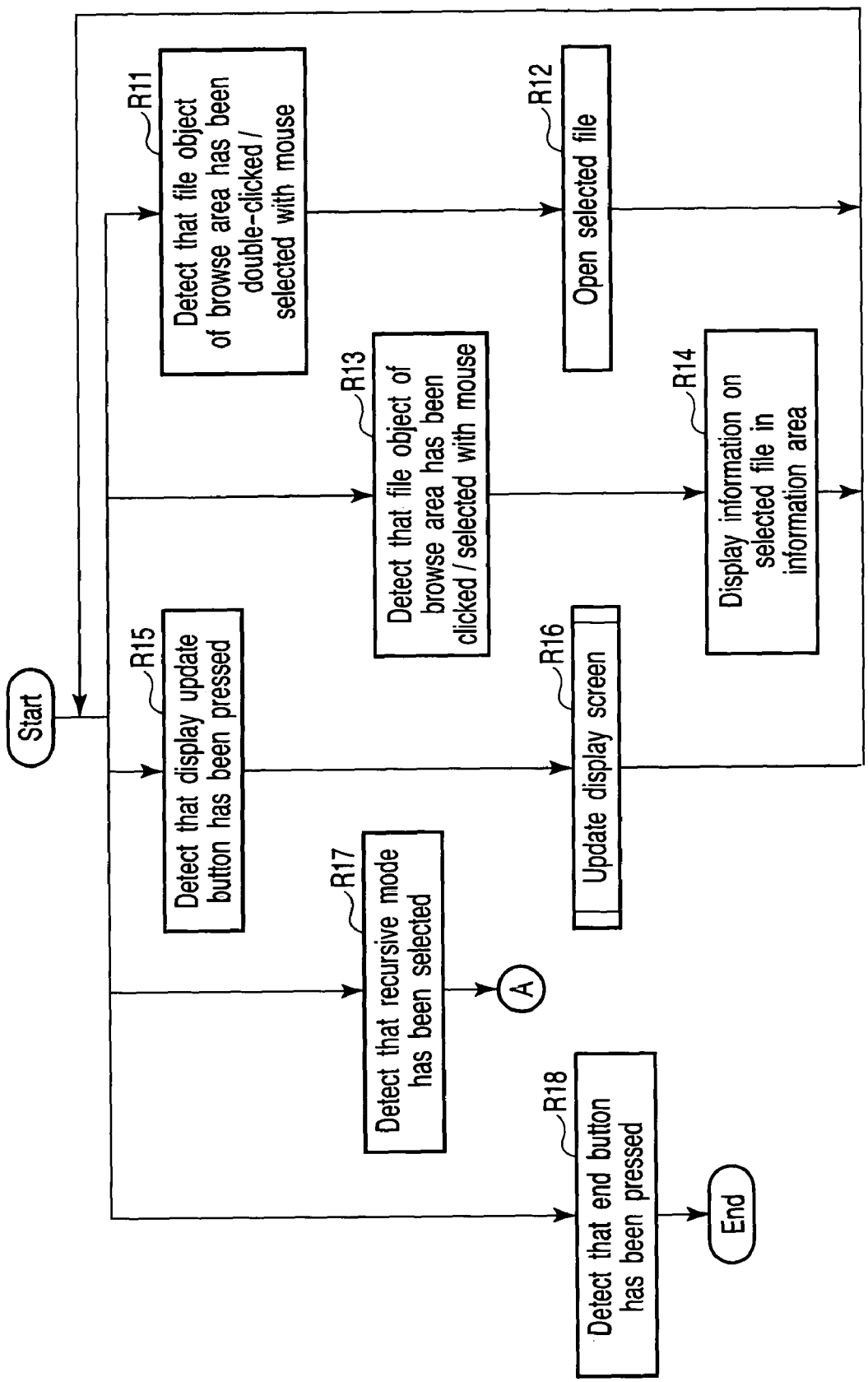
FIG. 18 is a flowchart showing a schematic operation procedure of a main process in a file classification process of a standard mode.

FIG. 18 is a flowchart showing a schematic operation procedure of a main process in a file classification process of a standard mode shown in the step T33 of FIG. 16.

When it is determined in step R11 that the file object displayed in the browse area 31 has been double-clicked/selected with the mouse in the classification screen of the standard mode, in step R12, the selected file is opened and displayed. Moreover, the process waits until the next user's operation.

When it is determined in step R13 that the file object displayed in the browse area 31 has been clicked/selected with the mouse, in step R14, information on the selected file is displayed in the selection information area 33. Moreover, the process waits until the next user's operation.

Moreover, in step R15, when it is detected that the display update button 8 has been pressed by changing settings of the X setting area 11, the Y setting area 21, and the browse setting area 32, the display screen is updated in step R16. Since this display screen update process is similar to procedure shown in FIG. 17 (steps R01 to R03), detailed description is omitted. Furthermore, after executing the display screen update process, the next user's operation is waited for.

When it is detected in step R17 that the recursive mode has been selected from the mode selection column 6, the process return to the start of FIG. 16, and the process of the recursive mode is executed from the step T30. In contrast, when it is detected in step R19 that the end button 9 has been pressed, the file classification process of the standard mode of the step S06 ends.

When Yes in the step T30, that is, when the selected mode is the recursive mode, in step T35, the file classification screen frame of the recursive mode is displayed. Moreover, in step T36, the display screen is updated. Since this display screen update process is similar to the procedure (steps R01 to R05) shown in FIG. 17, detailed description is omitted. Moreover, after executing the display screen update process, the file classification process of the recursive mode is executed in step T37. The file classification process of this recursive mode is performed in the classification screen (e.g., FIGS. 7, 9) of the recursive mode in accordance with the user's operation.

Figure 19:
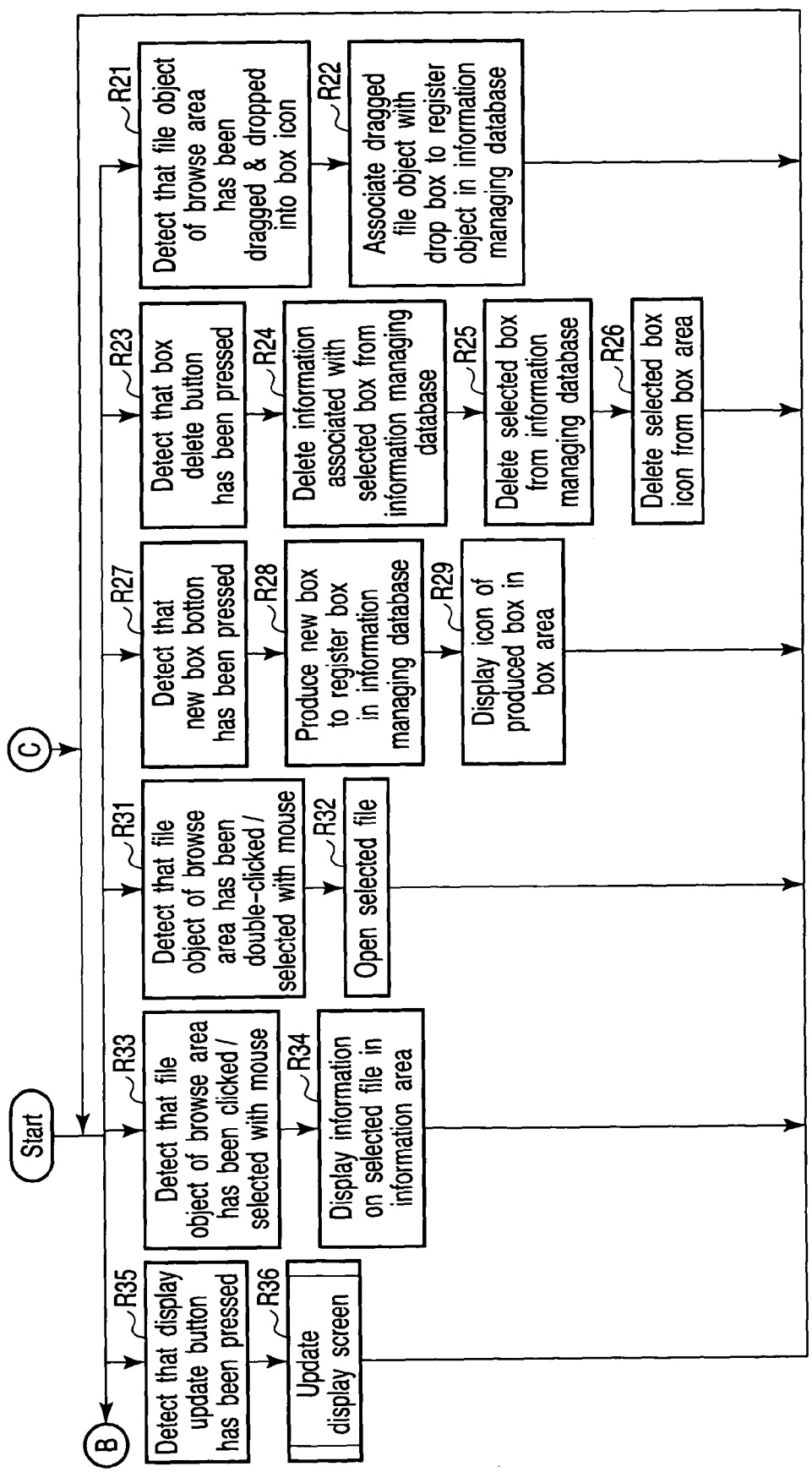
FIG. 19 is a flowchart showing a schematic operation procedure of a main process in a file classification process of a recursive mode.
Figure 20:
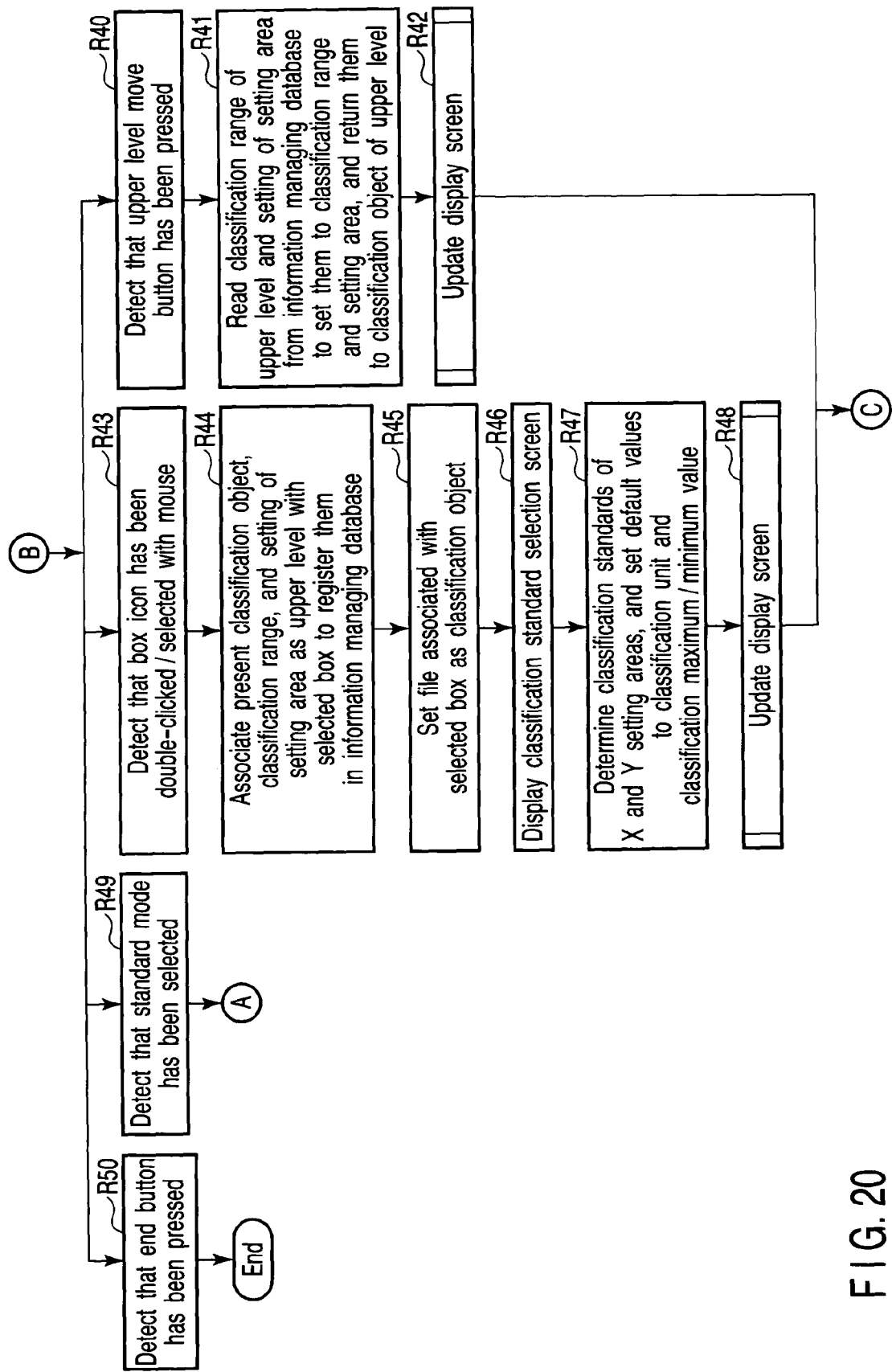
FIG. 20 is a flowchart showing a schematic operation procedure of the main process in the file classification process of the recursive mode.

FIGS. 19 and 20 are flowcharts showing a schematic operation procedure of a main process in the file classification process of the recursive mode shown in the step T37 of FIG. 16.

It is detected in step R21 that the file object of the browse area 31 has been dragged and dropped into the box icon 46 in the classification screen of the recursive mode shown in FIG. 7 or 9. In this case, in step R22 the dragged file object is associated with the box 46 into which the object has been dropped to register the object in the information managing data base 67. Moreover, the next user's operation is waited for.

When it is detected in step R23 that the box delete button 48 of the box operation area 45 has been pressed, in step R24, information associated with the selected box 46 is deleted from the information managing data base 67, and in step R25, the registration of the selected box 46 is deleted from the information managing data base 67. Moreover, in step R26, the selected box icon 46 is deleted from the box area 44. Moreover, the next user's operation is waited for.

When it is detected in step R27 that the new box button 47 has been pressed, in step R28 a new box is produced and registered in the information managing data base 67. Moreover, in step R29, the icon of the produced box 46 is displayed in the box area 44. Moreover, the next user's operation is waited for.

When it is detected in step R31 that the file object displayed in the browse area 31 has been double-clicked/selected with the mouse, in step R32, the selected file is opened and displayed. Moreover, the next user's operation is waited for.

When it is detected in step R33 that the file object displayed in the browse area 31 has been clicked/selected by the mouse, in step R34, information on the selected file is displayed in the selection information area 33. Moreover, the next user's operation is waited for.

Moreover, when it is detected in step R35 that the settings of the X setting area 11, Y setting area 21, and browse setting area 32 are changed and the display update button 8 has been pressed, in step R36 the display screen is updated. Since the display screen update process is similar to the procedure (steps R01 to R03) shown in FIG. 17, detailed description is omitted. Moreover, after executing the display screen update process, the process is on standby till the next user's operation.

When it is detected in step R40 of FIG. 20 that the level moving button 43 has been pressed, in step R41, the classification range of the upper level and the setting of the setting area are read from the information managing data base 67, set to the classification range and the setting area, and returned to the classification object of the upper level. Moreover, in step R42, the display screen is updated to a new screen. Since the display screen update process is similar to the procedure (steps R01 to R03) shown in FIG. 17, the detailed description is omitted. Moreover, after updating the display screen, the process is on standby till the next user's operation.

When it is detected in step R43 that the icon of the box 46 has been double-clicked/selected with the mouse, the screen of the next level is displayed. Then, in step R44, the present classification range, and the settings of the X setting area 11 and the Y setting area 21 are associated as the upper level with the selected box to register them in the information managing data base 67. Moreover, in step R45, as the values to be displayed in the classification area, the classification object is associated with the selected box 46 in the step R22 to constitute the file registered in the information managing data base 67.

Moreover, in step R46, the classification standard selection screen shown in FIG. 8 is displayed, for example, as a popup screen. As described above, the user can select the classification standards of the X and Y directions with less operations on this screen. Moreover, when the selection of the classification standards is defined, in step, default values are set to the classification units and the classification maximum/minimum values in accordance with the selected X and Y setting standards, and in step R48, the display screen is updated to a new screen. Since the display screen update process is similar to the procedure (steps R01 to R03) shown in FIG. 17, the detailed description is omitted. Moreover, after updating the display screen, the process is on standby till the next user's operation.

When it is detected in step R49 that the standard mode has been set from the mode selection column 6, the process returns to the start of FIG. 16 to execute the process of the standard mode from the step T30. On the other hand, when it is detected in step R50 that the end button 9 has been pressed, the file classification process of the recursive mode of the step S06 ends. It is to be noted that the flow returning to "start" in FIGS. 14, 15, 18, 19 indicates that the flow returns to the end of the step S04 of FIG. 12.

According to the above-described information managing method of the first embodiment, even when there is a large amount of object information, the information can be easily classified, and therefore the information can be efficiently and securely managed.

An information managing method of a second embodiment of the present invention relates to a method of facilitating the managing while focusing and selecting the information.

In the information managing method of the second embodiment of the present invention, a user inputs an operation instruction for handing the file based on a file display screen displayed in a display device of an information processing apparatus.

Figure 21:
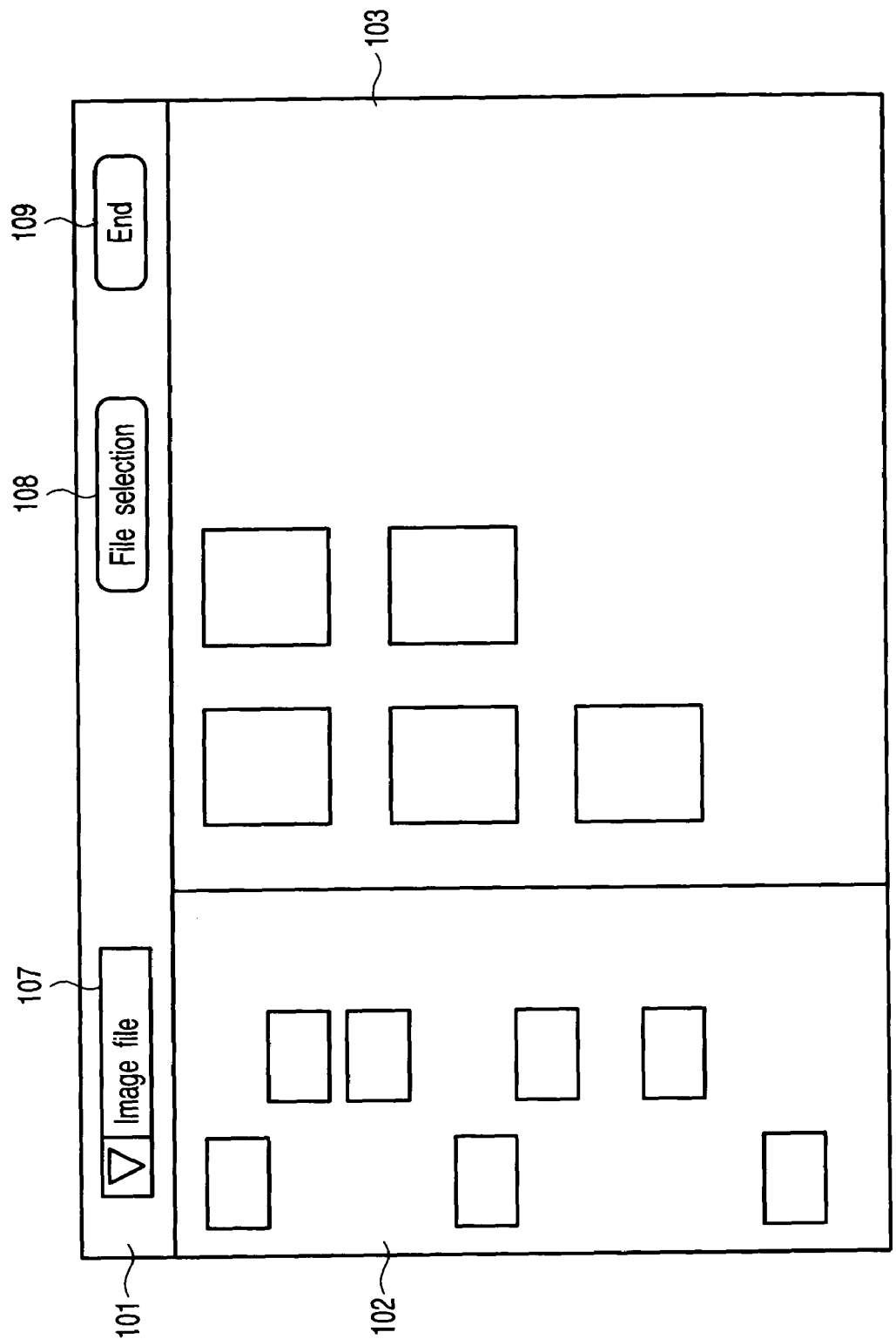
FIG. 21 is a diagram showing a constitution of a file display screen by an information managing method of a second embodiment of the present invention.

FIG. 21 is a diagram showing a constitution of the file display screen by the information managing method of the second embodiment of the present invention.

This file display screen comprises: a tool bar area 101 for operating screen display; a folder area 102 to display a tree structure of a folder in which the file is stored; and a file area 103 to display the file stored in the specified folder.

Moreover, in the tool bar area 101, a file type selection list column 107, a file selection button 108, and an end button 109 are disposed.

Next, a method of selecting the file will be described with reference to FIGS. 22 and 23.

Figure 22:
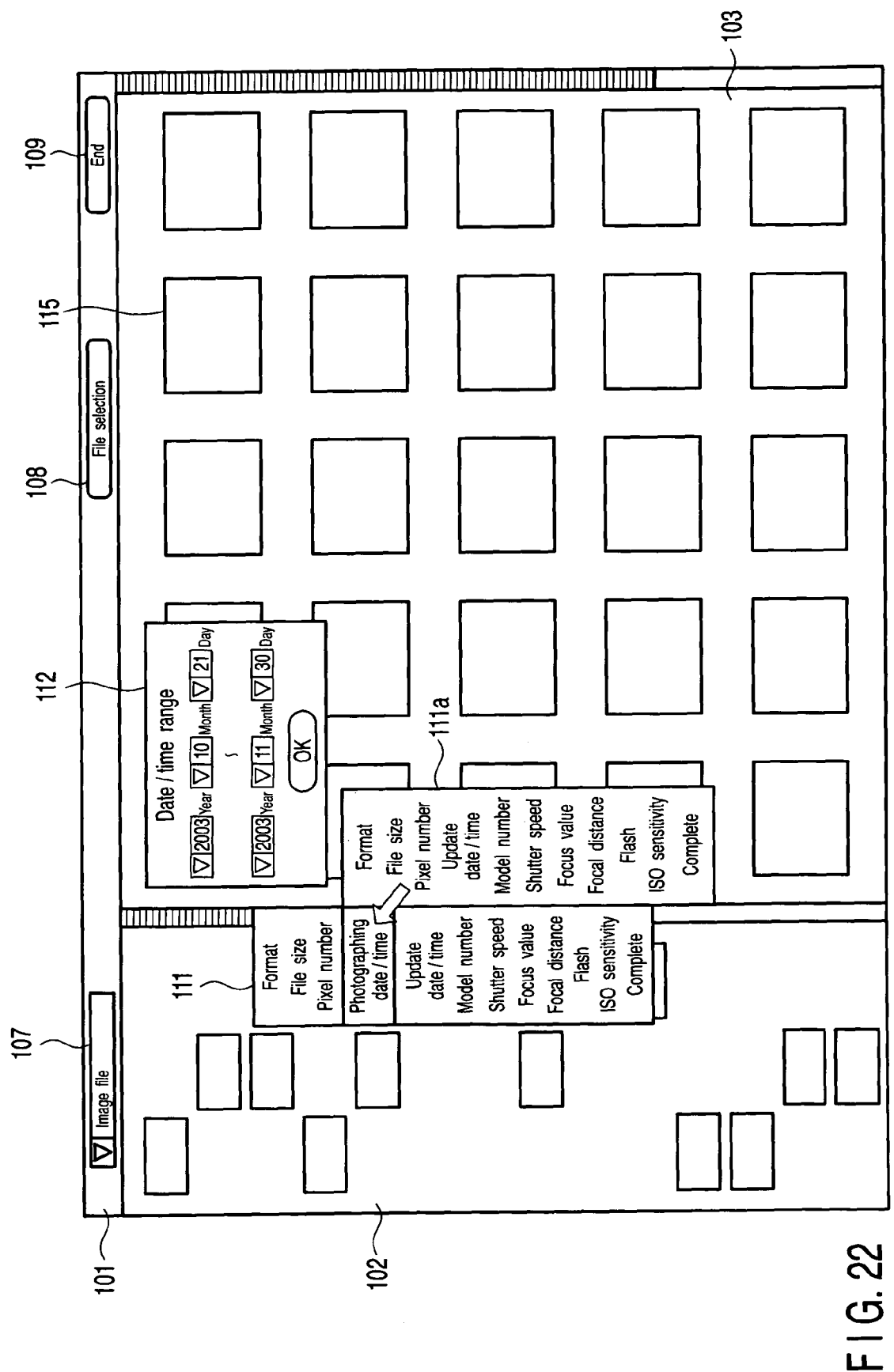
FIG. 22 is an explanatory view of a method of selecting an image file.
Figure 23:
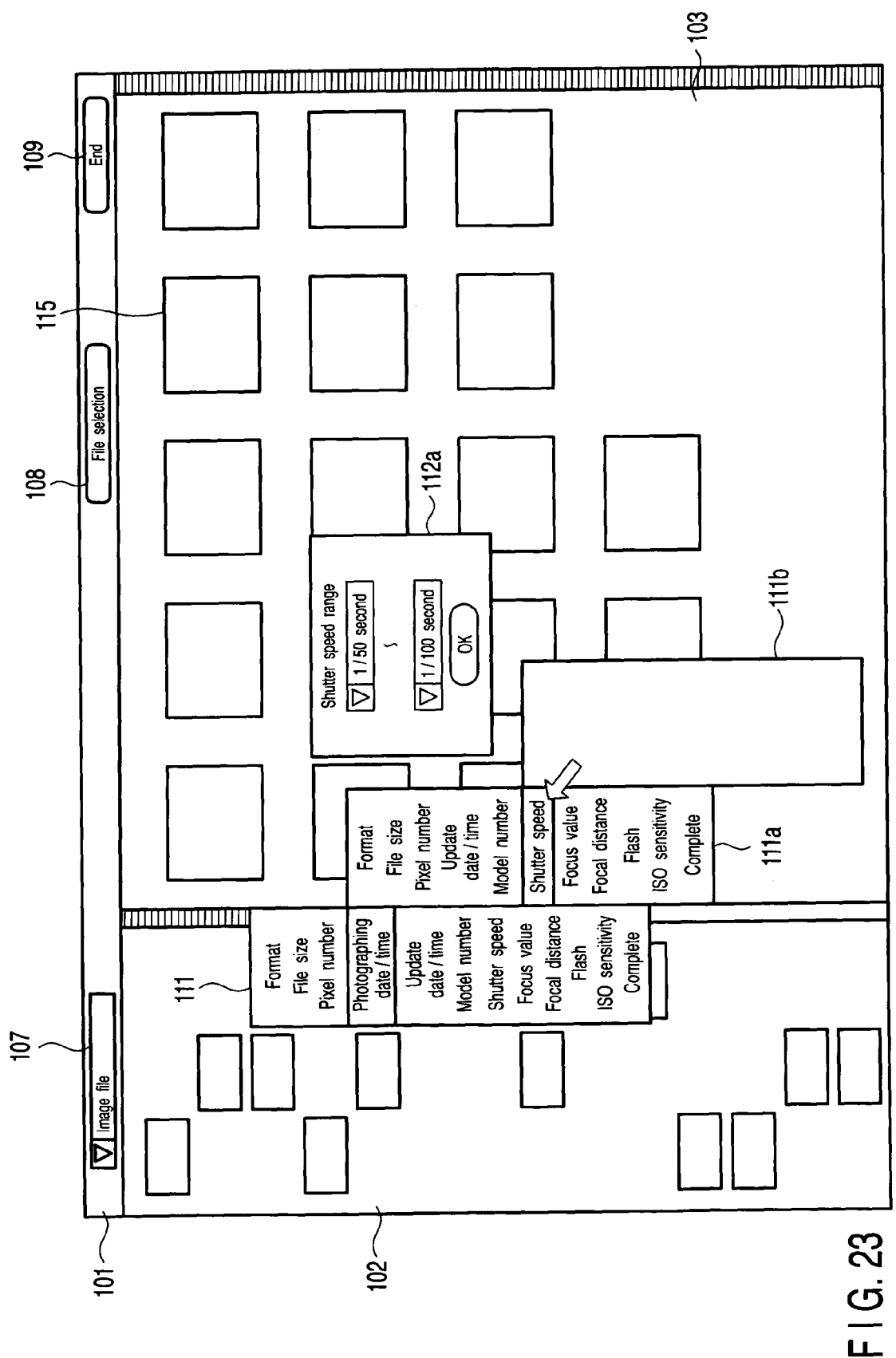
FIG. 23 is an explanatory view of a method of selecting the image file.

FIGS. 22 and 23 are explanatory views of a method of selecting an image file.

The user selects a type of the file which is an object from the file type selection list column 107 of the tool bar area 101. For example, the user selects "image file". Then, folder icons in which the "image files" are stored are displayed as identification information such as names of icons or folders in a tree structure in the folder area 102.

When the user clicks and specifies the folder icon, thumbnail images (reduced images) 115 of the image files included in the folder are displayed in the file area 103. It is to be noted that when the folder is specified, a plurality of folder icons can be selected. At this time, the thumbnail images 115 of all the image files included in the plurality of folders are displayed in the file area 103. When the folder is specified, and a sub-folder is included in the folder, the files stored in the sub-folder are also displayed.

It is to be noted that in the above-described operation method, first the "image file" is selected as a file type, and thereafter the folder is specified, but an inverse operation may be performed. That is, first the tree structure of all the folders stored in the storage device of the information processing apparatus is displayed, the folder is specified from the tree structure, and all the files included in the folder are displayed. Moreover, the "image file" may be next designated to select the file from the file type selection list column 107.

Next, when the user presses the file selection button 108, an attribute selection list 111 is displayed in which attribute information of the image file is described. In the attribute selection list 111 of FIG. 22, photographing attributes of the image files are displayed. In the photographing attributes, "format" indicates file formats such as JPEG and TIFF, and "model number" means, for example, an photographing apparatus, a camera type name and the like. This photographing attribute is information imparted to each image file, and sent to the information processing apparatus from the camera together with the image file.

When the user designates "photographing date/time" from the attribute selection list 111, an attribute range setting dialog 112 is displayed. The user inputs a range of the "photographing date/time" in the attribute range setting dialog 112.

In FIG. 22, the range is input in such a manner as to select the image files photographed in a period from Oct. 21, 2003 till Nov. 30, 2003.

When the user presses the OK button of the attribute range setting dialog 112, the image file having an attribute value of the set attribute range is selected, and the thumbnail images 115 of the selected image files are displayed in the file area 103.

Moreover, a new attribute selection list 111a is also displayed. In the attribute selection list 111a, the item "photographing date/time" is excluded from the attribute information displayed in the attribute selection list 111.

When the user designates "shutter speed" from the attribute selection list 111a, an attribute range setting dialog 112a shown in FIG. 23 is displayed. The user inputs a range of the "shutter speed" into the attribute range setting dialog 112a. In FIG. 23, the range is input in such a manner as to select image files photographed at a shutter speed of 1/50 to 1/100 second.

When the user presses the OK button of the attribute range setting dialog 112a, the image file having the attribute value of the set attribute range is selected from the image files displayed in the file area 103, and the thumbnail images 115 are displayed in the file area 103.

Moreover, a new attribute selection list 111b is also displayed. In the attribute selection list 111b, the items "photographing date/time" and "shutter speed" are excluded from the attribute information displayed in the attribute selection list 111.

When the user further selects the items from the attribute selection list 111b, the above-described operation is repeated. The user can efficiently select a desired image file while referring to the thumbnail image displayed in the file area 103. When the user further selects "complete" from the attribute selection list 111b, all the attribute selection lists 111, 111a, 111b displayed in the file display screen are deleted to end the file selection operation.

It is to be noted that not only the thumbnail images but also the icons or the file names may be displayed in the file area 103, and as to files other than the image files, icons or file names, icons or file names clearly indicating information which can specify the files may be displayed.

Subsequently, a constitution of an information processing apparatus for realizing the above-described file selection method, and a main process procedure will be described. The constitution of the information managing apparatus is the same as that of the information managing apparatus of the first embodiment shown in FIG. 11, and the functions of constituting sections are also the same. Therefore, the same components are denoted with the same reference numerals, and detailed description thereof is omitted.

FIG. 24 is a flowchart showing a schematic process procedure of an information managing program for selecting the file. It is to be noted that the process described hereinafter relates to a main function in the functions of the present information managing program. Therefore, even when a certain function is not described hereinafter, but when the function is described in FIGS. 22 and 23, the function is included in the functions of the present information managing program.

In the information managing program, it is first checked in step S101 whether or not the information on the file or the folder is registered in an information managing data base 67. Moreover, if No in the step S101, that is, when the information is not registered, the information managing data base is constructed in step S102.

Figure 25:
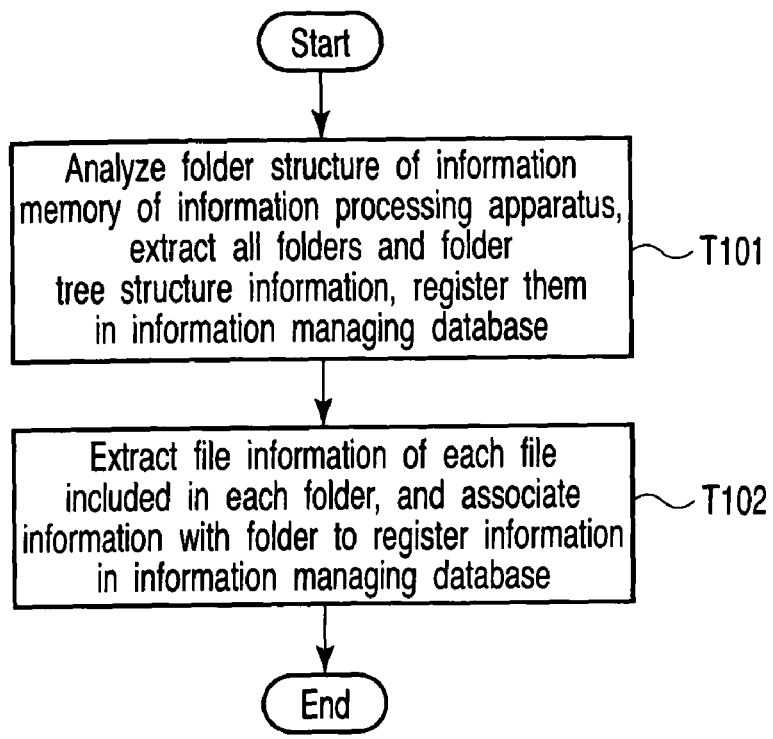
FIG. 25 is a flowchart showing a schematic process procedure of information managing data base construction.

FIG. 25 is a flowchart showing a schematic process procedure of the information managing data base construction.

In step T101, in the information managing program, the structure of the folder stored in an information memory 66 of an information managing apparatus 60 is analyzed. Moreover, information on all folders, and folder tree structure information are extracted, and the information is stored in the information managing data base 67. Subsequently, in step T102, the information managing program extracts the file information of the file included in each folder, and associates the information with the folder to register the information in the information managing data base 67.

It is to be noted that to manage the information file stored in an external information processing apparatus by the information managing data base, after end of the step T102, the external information processing apparatus connected to a communication interface 61 is identified, identification information is stored in the information managing data base, and a process similar to that of the steps T101 and T102 is executed using the external information processing apparatus as an object. The extracted folder tree structure or file information is associated with the identification information of the external information processing apparatus, and stored in the information managing data base.

After constructing the information managing data base 67, turning back to FIG. 24, selected folder information stored in the setting memory is read in step S103. Here, the setting memory stores a state used in the previous setting process by the information managing program in a storage region disposed in the information managing data base 67. Then, in step S104, the information managing program selects the folder in accordance with the setting information, and displays the icons of the files included in the folder. Therefore, the user can start the operation from the same setting state as the previous state.

Subsequently, any of a register/delete/update process of the file information shown in step S105, a register/delete process of folder information shown in step S106, a file selection process shown in step S107, and an end process shown in step S108 is executed.

Figure 26:
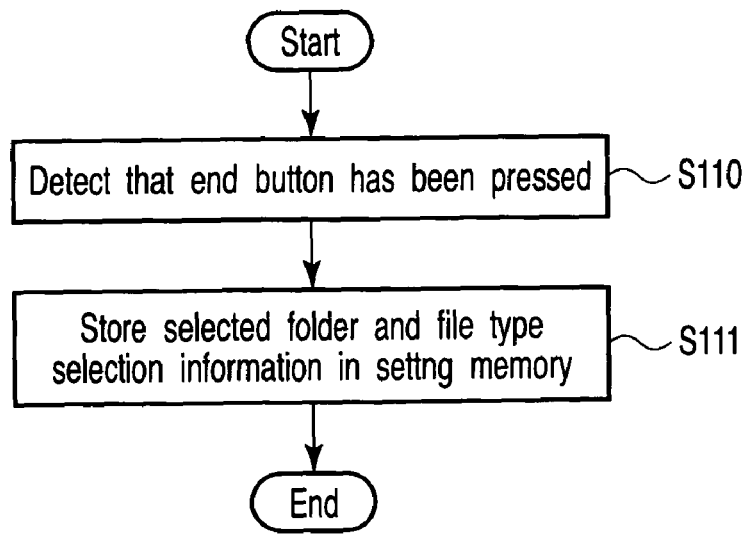
FIG. 26 is a flowchart showing an end process procedure.

FIG. 26 is a flowchart showing the end process shown in the step S108.

When it is detected in step S110 that an end button 109 of the tool bar area 101 has been pressed, in step S111, the folder selected on the screen immediately before pressing the end button, and file type selection information are stored in the setting memory, conditions are arranged in such a manner that the operation can be started from this set state in the next file selection process, and the operation ends in the information managing program.

The file is prepared, deleted, updated, and the folder is prepared, deleted also by an operating system (OS) or other application software. The information managing program of the present embodiment monitors a state change of the file or the folder by software (including the OS) other than its own software, and updates the information of the information managing data base when detecting the preparation or deletion of the file or the folder.

It is to be noted that moving, copying, deleting, and name changing of the file or the folder are included in a file selection function of the present invention. To execute these operations, a right button of the mouse may be pressed to display a menu so that the operation can be selected in the menu. Alternatively, an operation button or menu may be disposed in the tool bar in an upper part of the screen.

Figure 27:
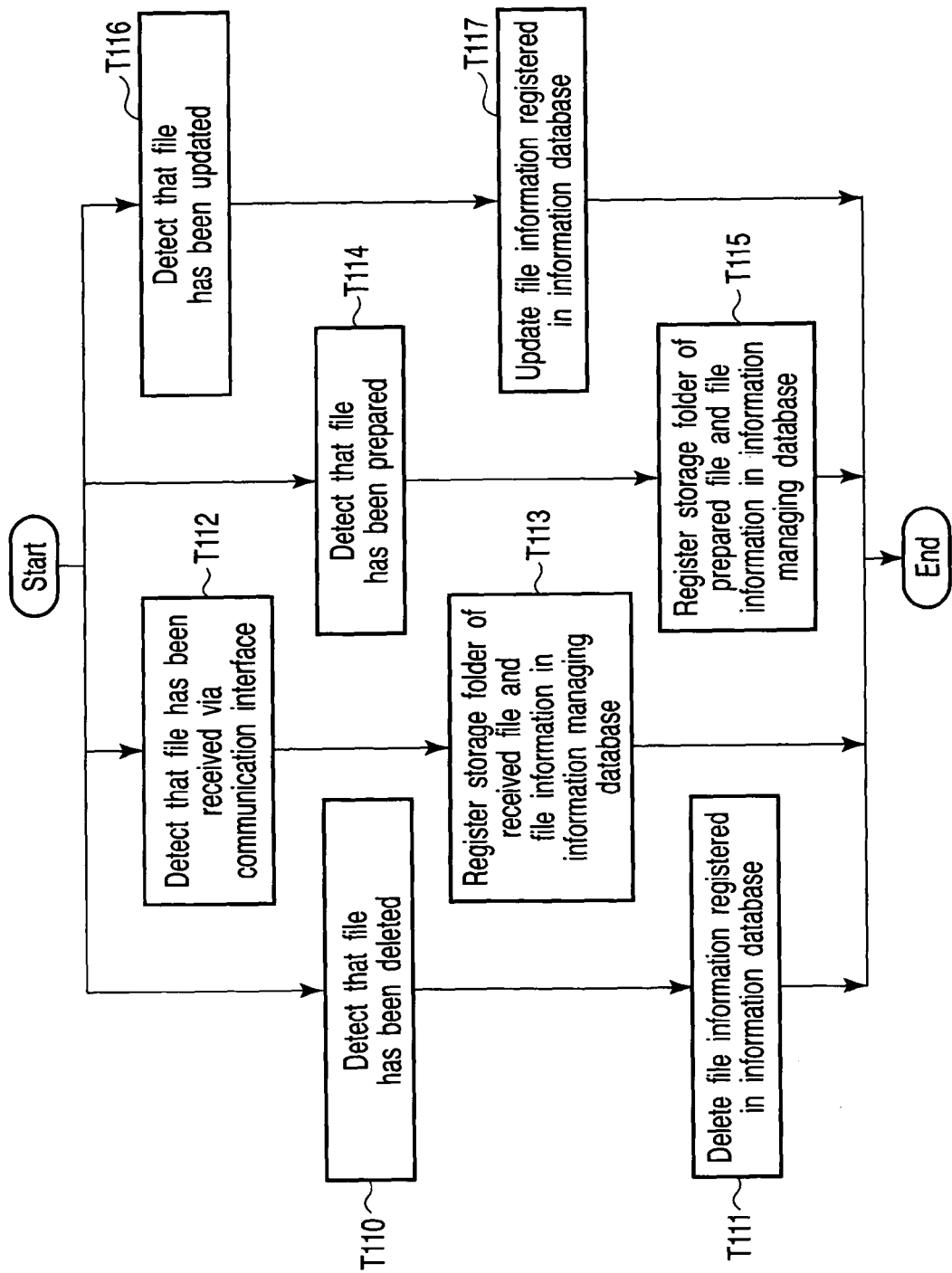
FIG. 27 is a flowchart showing a schematic process procedure to register/delete/update file information.

FIG. 27 is a flowchart showing a schematic process procedure to register/delete/update file information shown in the step S105 of FIG. 24.

When it is detected in step T110 that the file has been deleted, in step T111 the file information of the file registered in the information managing data base 67 is deleted.

When it is detected in step T112 that the file has been received the communication interface 61, in step T113, a storage folder of the received file and file information are registered in the information managing data base.

When it is detected in step T114 that a file has been newly prepared, in step T115, the storage folder of the prepared file and file information are registered in the information managing data base.

When it is detected in step T116 that the file has been updated, in step T117, file information registered in the information managing data base of the updated file is updated.

When any process of the above-described steps T110 and T111, T112 and T113, T114 and T115, and T116 and T117 is completed, the register/delete/update process of the file information shown in the step S105 ends.

Figure 28:
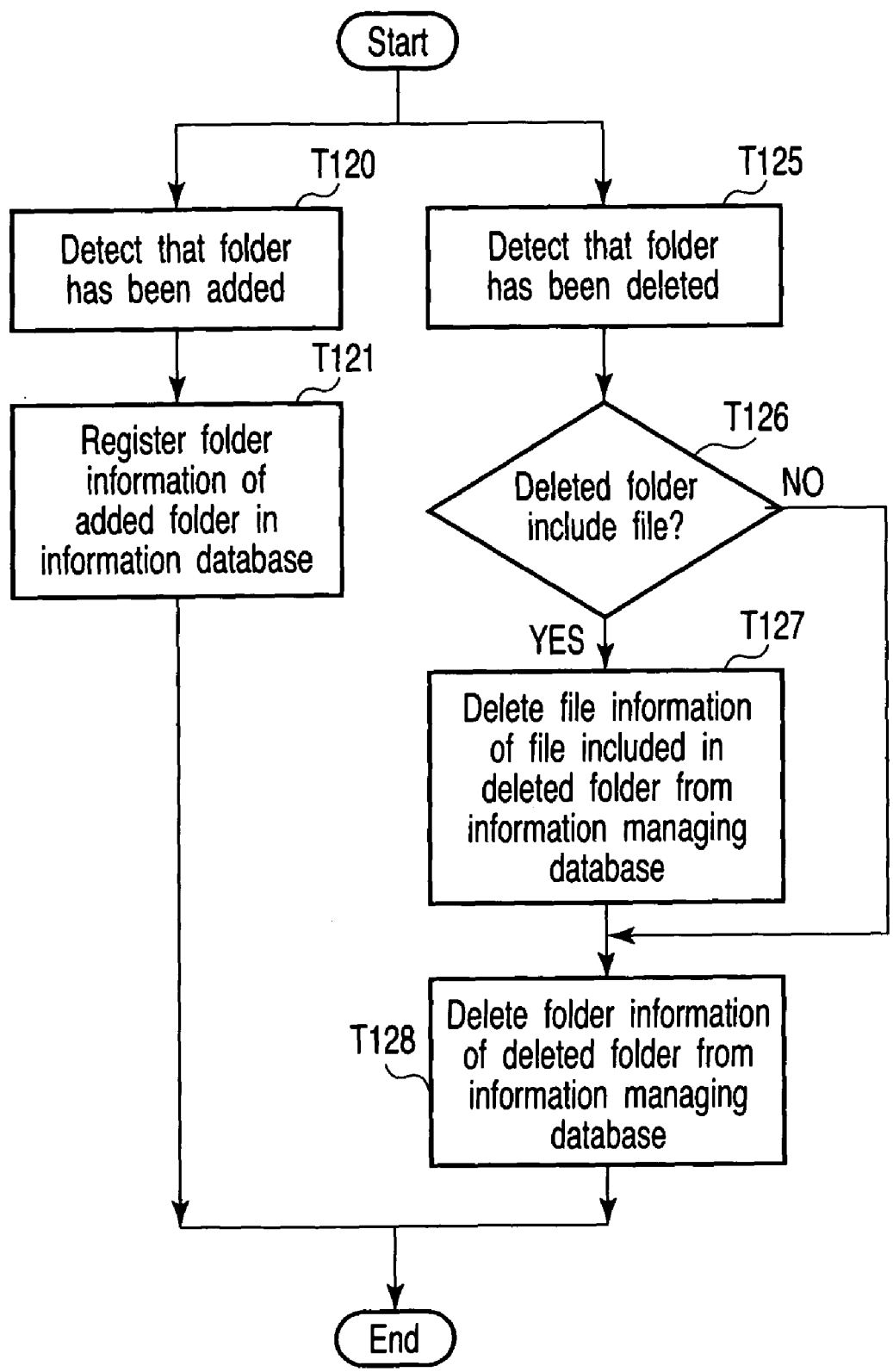
FIG. 28 is a flowchart showing a schematic process procedure to register/delete folder information.

FIG. 28 is a flowchart showing a schematic process procedure to register/delete folder information shown in the step S106 of FIG. 24.

When it is detected in step T120 that the folder has been newly added, in step T121, the folder information of the added folder is registered in the information managing data base.

When it is detected in step T125 that the folder has been deleted, it is checked in step T126 whether or not the deleted folder has included the file. When Yes in the step T126, that is, when the file is included, in step T127, the file information of the file included in the deleted folder is deleted from the information managing data base. Moreover, in step T128, the folder information of the deleted folder is deleted from the information managing data base 67.

Moreover, the register/delete process of the folder information shown in the step S106 ends.

Figure 29:
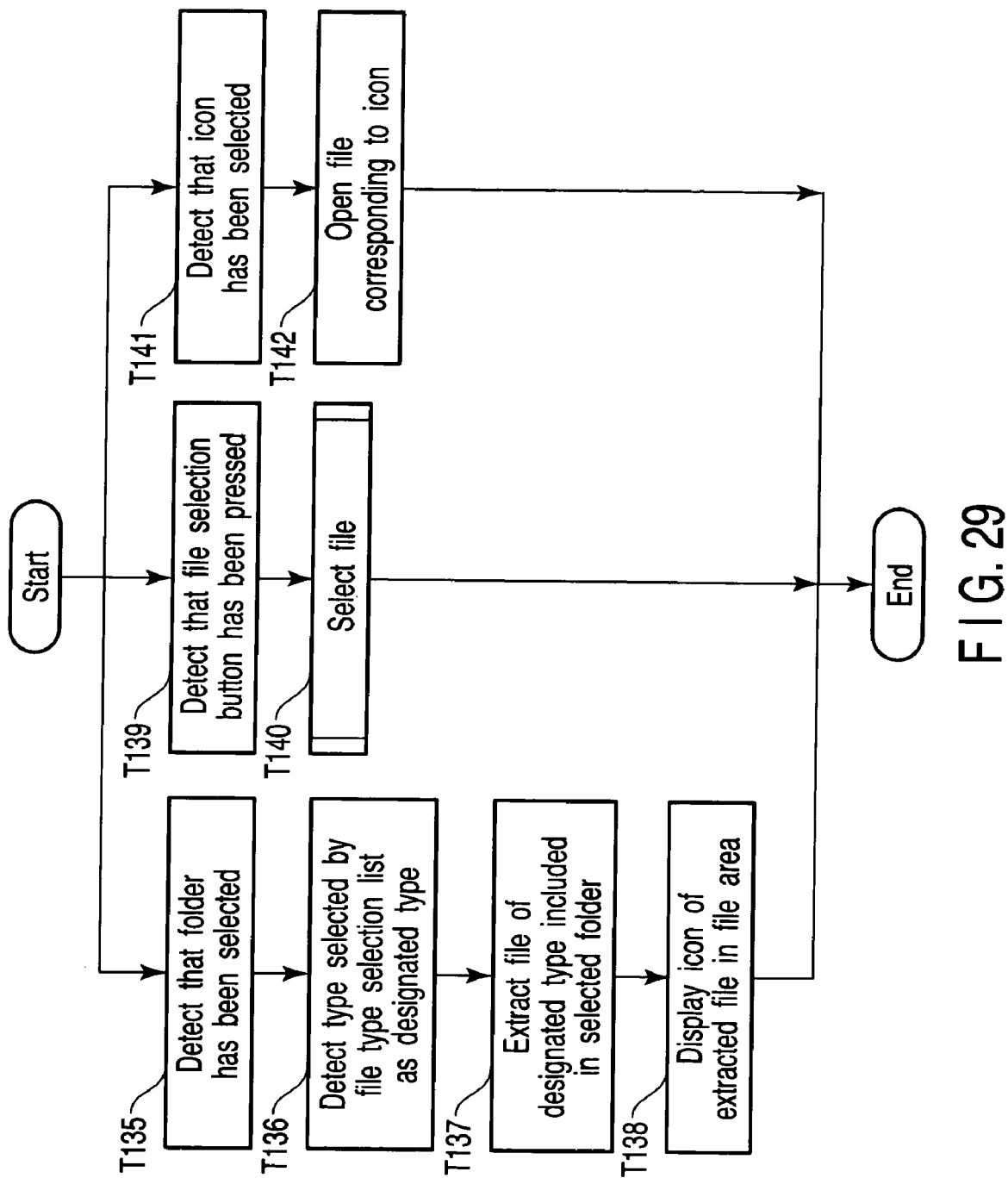
FIG. 29 is a flowchart showing a schematic operation procedure of a file selection process.

FIG. 29 is a flowchart showing a schematic operation procedure of a file selection process shown in the step S107 of FIG. 24.

When it is detected in step T135 that the folder displayed in the folder area 102 has been selected, in step T136, the type selected by the file type selection list column 107 is detected as "designated type". Moreover, in step T137, the file of the "designated type" is extracted from the files included in the selected folder, and in step T138, the icon of the extracted file is displayed in the file area 103.

When it is detected in step T139 that the file selection button 108 has been pressed, in step T140, the file is selected.

Figure 30:
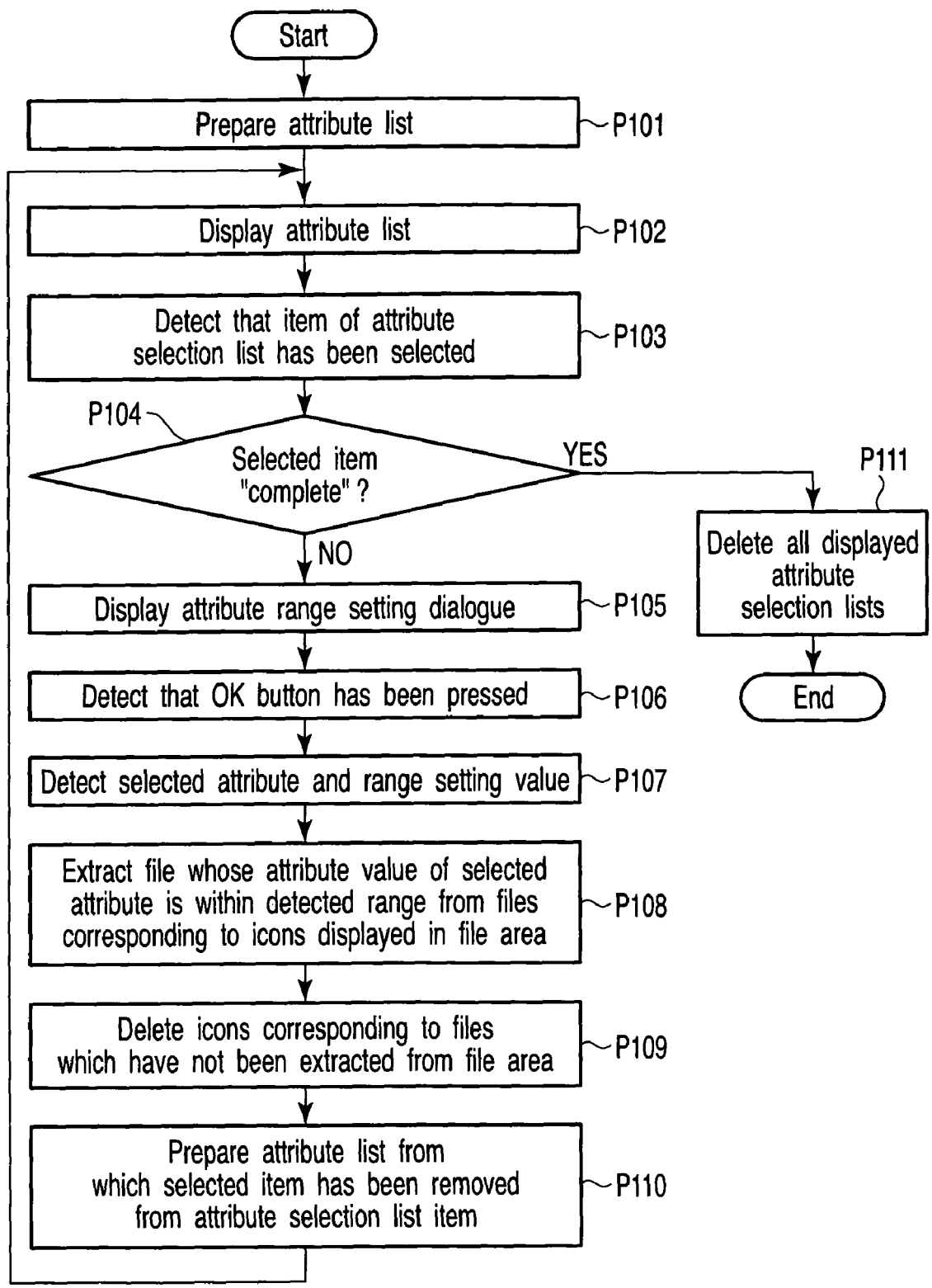
FIG. 30 is a flowchart showing a schematic operation procedure of the file selection process.

FIG. 30 is a flowchart showing a schematic operation procedure of the file selection process shown in the step T140 of FIG. 28.

In step P101, an attribute selection list in which attribute information of the displayed file is prepared, and in step P102, an attribute selection list 111 is displayed in a display section 62. Moreover, when it is detected in step P103 that the user has selected the item from the attribute selection list 111, the selected item is checked in step P104.

When No in the step P104, that is, when the item is other than "complete", in step P105, an attribute range setting dialog 112 corresponding to the item is displayed. When it is detected in step P106 that the user has set/input an attribute range via the attribute range setting dialog 112 and has pressed the OK button, in step P107, the selected attribute and the set range are detected.

Moreover, in step P108, a file whose attribute value of the selected attribute is within the detected range is executed from files corresponding to icons displayed in the file area 103. Subsequently, in step P109, the icons corresponding to the files which have not been extracted are deleted from the file area 103, in step P110, an attribute list is produced from which the selected item has been removed from the items of the attribute selection list 111, and the process of steps P102 to P110 is repeated.

When Yes in the step P104, that is, when the selected item is "complete", in step P111, all displayed attribute selection lists are deleted, and the file selection process of the step T140 of FIG. 29 ends.

When it is detected in step T141 of FIG. 29 that the icon of the file area 103 has been selected, in step T142, the file corresponding to the icon is opened. As to the image file, when the file is opened, the corresponding image is displayed. As to a general file, application software associated with the file displays contents of the file.

As described above, when the processes of the steps T135 to T138, T139 and T140, and T141 and T142 complete, the flow returns to FIG. 24 to end the file selection process of the step S107.

When any of the register/delete/update process of the file information of the step S105, the register/delete process of the folder information of the step S106, and the file selection process of the step S107 ends, the flow is on standby in preparation for the next operation input by the user.

It is to be noted that in the present embodiment, to register/delete/update the file and to register/update the folder, the steps of detecting the file or the folder executed by the OS or other application software, and updating the information data base information have been described. As described above, the moving, copying, deleting, and name changing of the file or the folder are included in a file operation. The moving, copying, deleting, and name changing of the folder are executed subsequently to the step T138, and these operations concerning the file are executed subsequently to the step T141 and in parallel with the step T142. Here, parallel execution indicates that any of these operations concerning the file and the operation of the step T142 is executed. Alternatively, the operation may be selected by the menu displayed by pressing the button of the mouse.

According to the information managing method of the second embodiment described above, even when a large amount of information is an object, the information can be easily selected, and therefore the information can be efficiently and securely managed.

Moreover, the type of the file which is the object of the present invention is not limited to the information managing apparatus, and the present invention is broadly applicable to various files such as a dynamic image file, sound file, and text information.

It is to be noted that the information managing method of the above-described first embodiment may be appropriately combine with that of the second embodiment. In this case, the functions of the same concept in the first and second embodiments can be integrated. For example, the X classification area 12 and the browse area 31 shown in FIG. 1 of the first embodiment can be treated in the same manner as in the folder area 102 and the file area 103 shown in FIG. 21 of the second embodiment.

It is to be noted that each function described in the above-described embodiment may be constituted using hardware. Alternatively, the program in which each function is described may be read and realized by a computer using software. Each function may be constituted by appropriately selecting either the software or the hardware.

Figure 31:
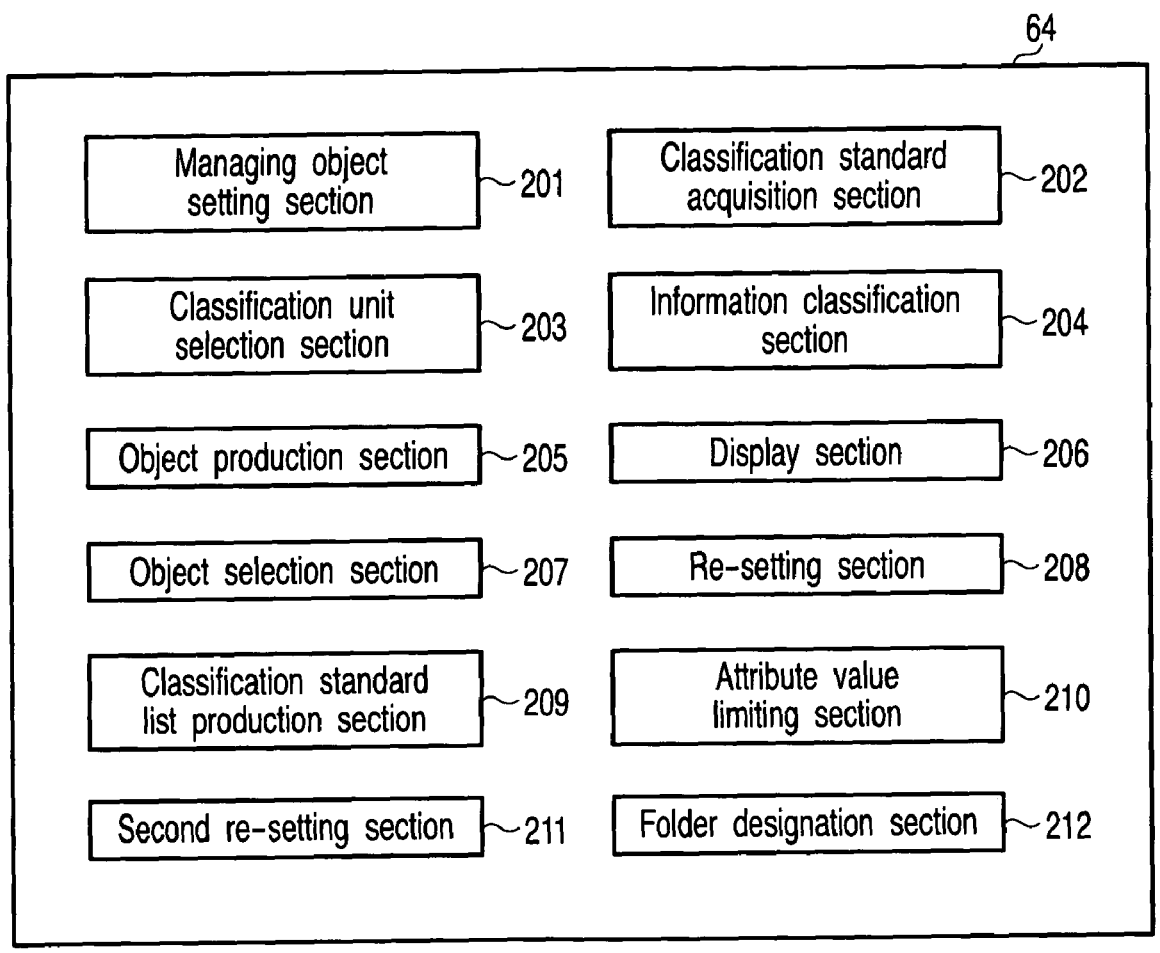
FIG. 31 is a diagram showing a constitution or a processing section.

For example, to constitute the present invention as an information managing apparatus, the processing section 64 of FIG. 11 may be finely divided into sections shown in FIG. 31. These sections embody the information managing function grasped from the above-described flowcharts as the hardware.

For example, the processing section 64 comprises at least a managing object setting section 201, a classification standard acquisition section 202, a classification unit selection section 203, an information classification section 204, an object production section 205, a display section 206, an object selection section 207, a re-setting section 208, a classification standard list production section 209, an attribute value limiting section 210, a second re-setting section 211, and a folder designation section 212.

The managing object setting section 201 sets the plurality of information files as managing objects. The classification standard acquisition section 202 acquires one or two classification standards which are standards to classify the information files. The classification unit selection section 203 selects one of classification units of each of the acquired classification standards. The information classification section 204 classifies the information files which are managing objects for the classification standards acquired by the classification standard acquisition section and for each selected one of the classification units. The object production section 205 produces a file object which represents each classified information file. The display section 206 disposes and displays the classification unit in a one-dimensional direction on a display screen of a display device, and disposes the file object produced for each classification unit in another one-dimensional direction, in a case where the classification standard acquisition section acquires one classification standard, and which disposes and displays the produced file object of the information file in each of two-dimensionally divided regions in a case where the classification standard acquisition section acquires two classification standards, the two-dimensionally divided regions being obtained by dividing the display screen for each classification unit of one classification standard in a predetermined one-dimensional direction and for each classification unit of the other classification standard in the other predetermined one-dimensional direction. The object selection section 207 selects the file object displayed in the display. The re-setting section 208 sets a plurality of information files corresponding to the file object selected by the object selection section as new managing objects in the managing object setting section. The classification standard list production section 209 produces a list of file attributes or data attributes of a plurality of information files which are the managing objects, which are items, as a classification standard list. The attribute value limiting section 210 limits a range of a value of the attribute with respect to the file attribute or the data attribute corresponding to the item selected from the classification standard list. The second resetting section 211 selects an information file having an attribute value in the range limited by the attribute value limiting section from the information file of the classification object to set the file as a new managing object in the managing object setting section. The folder designation section 212 designates one or a plurality of folders of an information storage section of the other information processing apparatus network-connected via the information storage section or a communication interface.

Furthermore, the program stored in a storage medium (not shown) may be read by a computer to thereby realize each function. Here, the storage medium in the present embodiment may have any recording format as long as the storage medium is capable of recording the program, and is readable by the computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An information managing method of managing a plurality of information files stored in at least one of information storage sections of an information processing apparatus or another information processing apparatus connected to the information processing apparatus via a network,
   wherein the plurality of information files are managing objects,
   the method comprising:
   (a) acquiring one or two classification standards which are standards to classify the information files;
   (b) selecting one of classification units of each of the acquired classification standards;
   (c) classifying the information files which are managing objects for each of the acquired classification standards and the selected one of the classification units;
   (d) producing a file object which represents each classified information file;
   (e) disposing and displaying the classification unit in a one-dimensional direction on a display screen of a display device, and disposing the file object produced for each classification unit in another one-dimensional direction, in a case where one classification standard is acquired;
   (f) disposing and displaying the produced file object of the information file in each of two-dimensionally divided regions in a case where two classification standards are acquired, the two-dimensionally divided regions being obtained by dividing the display screen for each classification unit of one classification standard in a predetermined one-dimensional direction and for each classification unit of the other classification standard in the other predetermined one-dimensional direction;
   (g) producing a list of items including the file attributes or the data attributes of a plurality of information files which are the managing objects as a classification standard list;
   (h) selecting at least one item as the classification standard from the classification standard list;
   (i) limiting a range of values of the attribute with respect to the selected file attribute or data attribute;
   (j) selecting an information file having the attribute value in the limited range from a plurality of information files which are the managing objects, and setting the information file as a new second managing object;
   executing the process of (a) to (f) with respect to the second managing object;
   selecting a plurality of second file objects from a plurality of first file objects classified and displayed on the display screen;
   setting a plurality of information files corresponding to the plurality of selected second file objects as new managing objects; and
   executing the process of (a) to (f) again,
   wherein the file object representing the information file is an icon representing the information file by a diagram or a file name displayed by a text, and
   wherein the classification unit includes items divided by at least a file attribute of the information file or a data attribute of data included in the information file.

2. The information managing method according to claim 1, wherein the classification standard includes at least a storage position which specifies a storage position of information of the information storage section of the information processing apparatus or the other information processing apparatus connected to the information processing apparatus via the network, and the classification unit is a folder in a case where the storage position is acquired as the classification standard.

3. The information managing method according to claim 1, further comprising:
   producing a second classification standard list obtained by deleting the selected item from the classification standard list as a new classification standard list, and executing the process of (h) to (j).

4. The information managing method according to claim 1, wherein the information file is an image file, and
   the classification unit includes at least items divided by a value of photographing information of an image included in the image file.

5. The information managing method according to claim 4, wherein the icon is a reduced image of the image.

6. The information managing method according to claim 1, further comprising:
   displaying a file object representing a plurality of other file objects incapable of being displayed in a case where the two-dimensionally divided regions on the display screen cannot display all file objects corresponding to all the classified file objects.

7. The information managing method according to claim 1, further comprising:
   designating one or a plurality of folders on the information processing apparatus or the other information processing apparatus connected to the information processing apparatus via the network; and
   setting information files included in the designated one or plurality of folders as managing objects.

8. The information managing method according to claim 7, further comprising:
   setting information files which exist in a sub-folder also as managing objects in a case where the selected one or plurality of selected folders include the sub-folder.

9. An information managing apparatus of managing a plurality of information files stored in at least one of an information storage section or an information storage section of another information processing apparatus connected to a network via a communication interface, comprising:
   a managing object setting section which sets the plurality of information files as managing objects;
   a classification standard acquisition section which acquires one or two classification standards which are standards to classify the information files;
   a classification unit selection section which selects one of classification units of each of the acquired classification standards;
   an information classification section which classifies the information files which are managing objects for the classification standards acquired by the classification standard acquisition section and for each selected one of the classification units;
   an object production section which produces a file object which represents each classified information file;

a display section which disposes and displays the classification unit in a one-dimensional direction on a display screen of a display device, and disposes the file object produced for each classification unit in another one-dimensional direction, in a case where the classification standard acquisition section acquires one classification standard, and which disposes and displays the produced file object of the information file in each of two-dimensionally divided regions in a case where the classification standard acquisition section acquires two classification standards, the two-dimensionally divided regions being obtained by dividing the display screen for each classification unit of one classification standard in a predetermined one-dimensional direction and for each classification unit of the other classification standard in the other predetermined one-dimensional direction;

an object selection section which selects a plurality of second file objects from a plurality of first file objects displayed in the display;

a re-setting section which allows the managing object setting section to set a plurality of information files corresponding to the plurality of second file objects selected by the object selection section as new managing objects;

a classification standard list production section which produces a list of items including the file attributes or the data attributes of a plurality of information files which are the managing objects as a classification standard list;

an attribute value limiting section which limits a range of values of the attribute with respect to the file attribute or the data attribute corresponding to at least one item selected from the classification standard list by the classification standard acquisition section; and a second re-setting section to select an information file having the attribute value in the range limited by the attribute value limiting section from a plurality of information files which are the managing objects and to allow the managing object setting section to set the information file as a new managing object, wherein the file object representing the information file produced by the object production section is an icon representing the information file by a diagram or a file name displayed by a text, and wherein the classification unit includes items divided by a file attribute of the information file or a data attribute of data included in the information file.

10. The information managing apparatus according to claim 9, wherein the classification standard includes at least a storage position which specifies a storage position of information of the information storage section of the information processing apparatus or the other information processing apparatus connected to the information processing apparatus via the network, and the classification unit is a folder in a case where the storage position is acquired as the classification standard.

11. The information managing apparatus according to claim 9, further comprising:
a classification standard list production section which produces a second classification standard list obtained by deleting the selected item from the classification standard list as a new classification standard list.

12. The information managing apparatus according to claim 9, wherein the information file is an image file, and
the classification unit includes at least items divided by a value of photographing information of an image included in the image file.

13. The information managing apparatus according to claim 12, wherein the icon is a reduced image of the image.

14. The information managing apparatus according to claim 9, wherein a file object representing a plurality of other file objects incapable of being displayed is displayed in a case where the two-dimensionally divided regions on the display cannot display all file objects corresponding to all the classified file objects.

15. The information managing apparatus according to claim 9 , further comprising:
a folder designation section which designates one or a plurality of folders of the information storage section or the information storage section of the other information processing apparatus connected to the network via the communication interface; and
a second re-setting section which allows the managing object setting section to set information files included in the one or the plurality of folders designated/selected by the folder designation section as the managing objects.

16. The information managing apparatus according to claim 15, wherein information files which exist in a sub-folder are also set as managing objects in a case where the folder designated by the folder designation section includes the sub-folder.

17. A non-transitory computer-readable storage medium storing an information managing program which manages a plurality of information files stored in at least one of information storage sections of an information processing apparatus or another information processing apparatus connected to the information processing apparatus via a network, the information managing program allowing a computer to execute:
a step of setting a plurality of information files as managing objects;
(a) a step of acquiring one or two classification standards which are standards to classify the information files;
(b) a step of selecting one of classification units of each of the acquired classification standards;
(c) a step of classifying the information files which are managing objects for each of the acquired classification standards and the selected one of the classification units;
(d) a step of producing a file object which represents each classified information file;
(e) a step of disposing and displaying the classification unit in a one-dimensional direction on a display screen of a display device, and disposing the file object produced for each classification unit in another one-dimensional direction, in a case where one classification standard is acquired;
(f) a step of disposing and displaying the produced file object of the information file in each of two-dimensionally divided regions in a case where two classification standards are acquired, the two-dimensionally divided regions being obtained by dividing the display screen for each classification unit of one classification standard in a predetermined one-dimensional direction and for each classification unit of the other classification standard in the other predetermined one-dimensional direction;
a step of selecting a plurality of second file objects from a plurality of first file objects classified and displayed on the display screen;
a step of setting a plurality of information files corresponding to the plurality of selected second file objects as new managing objects, and executing the process of (a) to (f) again;
a step of producing a list of items including the file attributes or the data attributes of a plurality of information files which are the managing objects as a classification standard list;

a step of selecting at least one item as the classification standard from the classification standard list;

a step of limiting a range of values of the attribute with respect to the selected file attribute or data attribute;

a step of selecting an information file having the attribute value in the limited range from a plurality of information files which are the managing objects, and setting the information file as a new second managing object; and a step of executing the process of (a) to (f) with respect to the second managing object, wherein the file object representing the information file is an icon representing the information file by a diagram or a file name displayed by a text, and wherein the classification unit includes items divided by at least a file attribute of the information file or a data attribute of data included in the information file.

18. The non-transitory computer-readable storage medium according to claim 17, wherein the classification standard includes at least a storage position which specifies a storage position of information of the information storage section of the information processing apparatus or the other information processing apparatus connected to the information processing apparatus via the network, and the classification unit is a folder in a case where the storage position is acquired as the classification standard.

19. The non-transitory computer-readable storage medium according to claim 17, which records the program further allowing the computer to execute:

a step of producing a second classification standard list obtained by deleting the selected item from the classification standard list as a new classification standard list, and executing the process of (h) to (j).

20. The non-transitory computer-readable storage medium according to claim 17, wherein the information file is an image file, and the classification unit includes at least items divided by a value of photographing information of an image included in the image file.

21. The non-transitory computer-readable storage medium according to claim 20, wherein the icon is a reduced image of the image.

22. The non-transitory computer-readable storage medium according to claim 17, which records the program further allowing the computer to execute:

a step of displaying a file object representing a plurality of other file objects incapable of being displayed in a case where the two-dimensionally divided regions on the display screen cannot display all file objects corresponding to all the classified file objects.

23. The non-transitory computer-readable storage medium according to claim 17, which records the program further allowing the computer to execute:

a step of designating one or a plurality of folders on the information processing apparatus or the other information processing apparatus connected to the information processing apparatus via the network; and a step of setting information files included in the designated one or plurality of folders as managing objects.

24. The non-transitory computer-readable storage medium according to claim 23, which records the program further allowing the computer to execute:

a step of setting information files which exist in a sub-folder also as managing objects in a case where the selected one or plurality of selected folders include the sub-folder.

* * * * *